(12) United States Patent
Itahashi et al.

(10) Patent No.: US 7,800,886 B2
(45) Date of Patent: Sep. 21, 2010

(54) ELECTRIC DOUBLE LAYER CAPACITOR

(75) Inventors: Tamon Itahashi, Tokyo (JP); Masahito Sekiguchi, Ikoma (JP); Taketoshi Kikuchi, Ibaraki (JP); Naoki Inui, Yamatokoriyama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 386 days.

(21) Appl. No.: 11/907,119

(22) Filed: Oct. 9, 2007

(65) Prior Publication Data

US 2008/0094777 A1    Apr. 24, 2008

Related U.S. Application Data

(63) Continuation-in-part of application No. PCT/JP2006/307688, filed on Apr. 5, 2006.

(30) Foreign Application Priority Data

| Apr. 12, 2005 | (JP) | ............................. 2005-114258 |
| Apr. 12, 2005 | (JP) | ............................. 2005-114259 |
| Apr. 10, 2006 | (JP) | ............................. 2006-107199 |
| Apr. 10, 2006 | (JP) | ............................. 2006-107200 |

(51) Int. Cl.
*H01G 9/00* (2006.01)

(52) U.S. Cl. .................. 361/502; 361/503; 361/504; 361/508; 361/512; 361/516

(58) Field of Classification Search ............... 361/502, 361/503–504, 508–512, 516–519, 523–529
See application file for complete search history.

(56) References Cited

U.S. PATENT DOCUMENTS

| 4,873,218 | A |   | 10/1989 | Pekala |   |
| 5,260,855 | A |   | 11/1993 | Kaschmitter et al. |   |
| 5,334,368 | A | * | 8/1994 | Beck et al. | 423/704 |
| 5,402,306 | A | * | 3/1995 | Mayer et al. | 361/502 |
| 5,945,084 | A |   | 8/1999 | Droege |   |
| 6,064,560 | A |   | 5/2000 | Hirahara et al. |   |
| 6,233,135 | B1 | * | 5/2001 | Farahmandi et al. | 361/502 |
| 6,284,696 | B1 | * | 9/2001 | Koya et al. | 502/64 |
| 6,493,209 | B1 | * | 12/2002 | Kamath et al. | 361/502 |

(Continued)

FOREIGN PATENT DOCUMENTS

EP    1 515 346 A1    3/2005

(Continued)

*Primary Examiner*—Nguyen T Ha
(74) *Attorney, Agent, or Firm*—Birch, Stewart, Kolasch & Birch, LLP

(57) ABSTRACT

An electric double-layer capacitor comprising an electrode containing an activated carbon, an electrolytic solution containing an electrolyte and a separator, wherein the electrolyte is an imidazolium salt represented by the following formula (1)

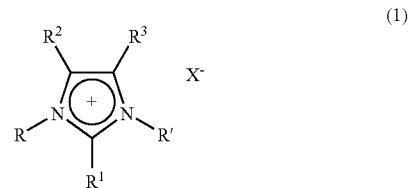

(1)

(wherein R and R' each independently represent alkyl group having 1 to 6 carbon atoms, $R^1$ to $R^3$ each independently represent hydrogen atom or alkyl group having 1 to 6 carbon atoms and $X^-$ represents a counter ion), and the activated carbon is produced by carbonizing an organic aerogel obtained by polymerizing a phenolic compound having at least one hydroxyl group in its molecule with an aldehyde compound in an aqueous solvent in the presence of a basic catalyst.

12 Claims, 2 Drawing Sheets

U.S. PATENT DOCUMENTS

| | | | |
|---|---|---|---|
| 6,515,845 B1 * | 2/2003 | Oh et al. | 361/502 |
| 6,649,083 B1 * | 11/2003 | Pinnavaia et al. | 252/179 |
| 7,167,354 B2 * | 1/2007 | Dietz et al. | 361/504 |

FOREIGN PATENT DOCUMENTS

| | | | |
|---|---|---|---|
| JP | 9-328308 A | | 12/1997 |
| JP | 11-054376 A | | 2/1999 |
| JP | 2002-511899 A | | 4/2002 |
| JP | 2004-273832 | | 9/2004 |
| JP | 2004-273832 A | | 9/2004 |
| JP | 2005-060158 A | | 3/2005 |
| JP | 2005187320 | * | 7/2005 |

* cited by examiner

ELECTRIC DOUBLE LAYER CAPACITOR

This application is a continuation-in-part of PCT/JP2006/307688 filed Apr. 5, 2006 and claims priority to: a) Application No. 2005-114258 filed in Japan on Apr. 12, 2005; b) Application No. 2005-114259 filed in Japan on Apr. 12, 2005; c) Application No. 2006-107199 filed in Japan on Apr. 10, 2006; and d) Application No. 2006-107200 filed in Japan on Apr. 10, 2006, all of which are incorporated by reference herein in their entirety.

FIELD OF THE INVENTION

The present invention relates to electric double-layer capacitors.

BACKGROUND OF THE INVENTION

Currently, electric energy-storage devices having large capacity are required in the fields such as midnight-power storage and auxiliary power supplies for power failure. Electric energy-storage devices having large capacity per unit volume, that is, having abilities of supplying power for long duration in spite of the small size thereof, are also required in the field of transportation vehicles characterized by battery-powered driving force such as battery-powered electric vehicles and hybrid electric vehicles and in the field of portable electric terminals such as mobile personal computers, cellular phones and portable audio devices.

Electric double-layer capacitors are expected as an electric energy-storage device, which are composed of an electrode, a separator and an electrolytic solution and store electric power in a boundary surface (electric double-layer) formed between an electrolyte and an electrode due to absorption of the electrolyte dissolved in an the electrolytic solution to the electrode. The capacity of stored energy is defined by the formula $\frac{1}{2} \cdot C \cdot V^2$ (wherein C is electrostatic capacity (F) and V is voltage), therefore in order to store more energy, the electrostatic capacity of electric energy-storage devices must be enhanced, especially in order to store more energy in compact volume, enhancement of electrostatic capacity per unit volume is required.

Activated carbons are commonly used for the electrode of electric double-layer capacitors, specifically included is an activated carbon having micropores (equal to or less than 20 Å of pore diameter) as major pores thereof which is obtained by carbonizing and activating palm shell and the like. U.S. Pat. No. 4,873,218 discloses in its table 1 an activated carbon produced from the organic aerogel obtained by polymerizing under the conditions that molar ratio (R/C) of resorcinol (R) to basic catalyst (C) is 200 to 410 and weight ratio (R/W) of resorcinol (R) to aqueous solvent (W) is 0.027 to 0.067, Kohyo (Published Japanese translations of PCT international publication for patent applications) No. 2002-511899 discloses in its claim 1 and Examples 1 to 4 an activated carbon produced from the organic aerogel obtained by polymerizing under the conditions that (R/C) is 2000 or more and (R/W) is 0.39 to 0.56, however, development of electric double-layer capacitors applying a novel activated carbon capable of more enhancing electrostatic capacity per unit volume is desired.

Recently, an activated carbon having meso-pores as major pores thereof is disclosed which is produced by polymerizing resorcinol with formaldehyde in the presence of a basic catalyst and an aqueous solvent to obtain an organic aerogel uniformly having meso-pores (equal to or more than 20 Å of pore diameter), washing the organic aerogel with an organic solvent, replacing the aqueous solvent to the organic solvent, drying and then carbonizing, and can be used for the electrode of electric double-layer capacitor having large electrostatic capacity per unit weight (refer to Kokai (Publication of unexamined patent applications) No. H9-328308 ([0017]), and Kohyo No. 2002-511899 (page 35)).

In the Kokai No. H9-328308 ([0017]), tetraethylammonium salt is used as an electrolyte, and in the Kohyo No. 2002-511899 (page 35), potassium hydroxide is used as an electrolyte, however, application of aqueous electrolytic solution such as potassium hydroxide for the electrolyte causes problems such as poor voltage endurance (voltage) and less storable energy capacity.

The present inventors studied the electric double-layer capacitor disclosed in the Kokai No. H9-328308 ([0017]), and found that this capacitor is disadvantageous to give sufficient electrostatic capacity per unit volume.

The present inventors have studied electric double-layer capacitors having few problems mentioned above, and found that electric double-layer capacitors containing a kind of electrolyte or a kind of activated carbon have enhanced electrostatic capacity per unit volume.

DISCLOSURE OF THE INVENTION

The object of the invention is to provide an electric double-layer capacitor having enhanced electrostatic capacity per volume.

The invention provides the following [1] to [12].

[1] An electric double-layer capacitor comprising an electrode containing an activated carbon, an electrolytic solution containing an electrolyte and a separator, wherein the electrolyte is an imidazolium salt represented by the following formula (1)

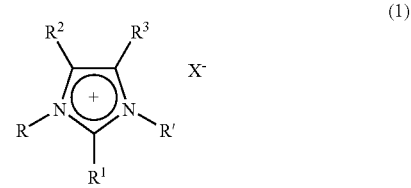

(wherein R and R' each independently represent alkyl group having 1 to 6 carbon atoms, $R^1$ to $R^3$ each independently represent hydrogen atom or alkyl group having 1 to 6 carbon atoms and $X^-$ represents a counter ion), and the activated carbon is produced by carbonizing an organic aerogel obtained by polymerizing a phenolic compound having at least one hydroxyl group in its molecule with an aldehyde compound in an aqueous solvent in the presence of a basic catalyst.

[2] The electric double-layer capacitor according to [1], wherein the counter ion for the electrolyte is at least one ion selected from the group consisting of trifluoroacetate ($CF_3CO_2^-$) and tetrafluoroborate ($BF_4^-$).

[3] The electric double-layer capacitor according to [1] or [2], wherein the phenolic compound is resorcinol.

[4] The electric double-layer capacitor according to any one of [1]-[3], wherein the activated carbon is produced by applying the phenolic compound in an amount of 0.25 to 1000 moles per 1 mole of the basic catalyst and 0.5 to 5 parts by weight per 1 part by weight of the aqueous solvent.

[5] The electric double-layer capacitor according to any one of [1]-[4], wherein the activated carbon is carbonized at 650 to 850° C.

[6] The electric double-layer capacitor according to any one of [1]-[5], wherein the activated carbon has pore volume of 1.5 cc/g or less.
[7] An activated carbon obtained by polymerizing a phenolic compound having at least one hydroxyl group in its molecule with an aldehyde compound in an aqueous solvent in the presence of a basic catalyst and having pore volume of 1.5 cc/g or less.
[8] The activated carbon according to [7], wherein the phenolic compound is resorcinol.
[9] An electrode containing the activated carbon according to [7] or [8].
[10] An electric double-layer capacitor comprising the electrode according to [9], a separator and an electrolytic solution.
[11] A method for producing an activated carbon comprising polymerizing a phenolic compound having at least one hydroxyl group in its molecule with an aldehyde compound in an aqueous solvent in the presence of a basic catalyst to obtain an organic aerogel, and carbonizing the organic aerogel, wherein the polymerization is conducted by applying the phenolic compound in an amount of 0.25 to 1000 moles per 1 mole of the basic catalyst and 0.5 to 5 parts by weight per 1 part by weight of the aqueous solvent.
[12] The method according to [11], wherein the carbonization is conducted at 650 to 850° C.

MODE FOR CARRYING OUT THE INVENTION

Figure 1:
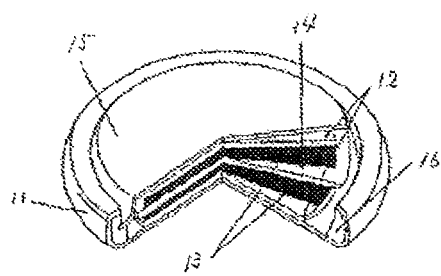
FIG. 1 is a schematic diagram of one embodiment of a coin-shaped electric double-layer capacitor.

The invention is explained in detail as follows.
The electric double-layer capacitor of the invention includes an electrode containing an activated carbon, an electrolytic solution containing an electrolyte and a separator.
The electrolyte used in the invention is an imidazolium salt represented by the following formula (1).

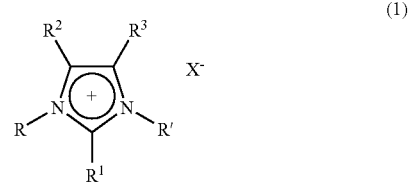

In the formula, R and R' independently represent alkyl group having 1 to 6 carbon atoms. The alkyl group having 1 to 6 carbon atoms includes, for example, methyl group, ethyl group, n-propyl group, n-butyl group, and the like. Among them, methyl group and ethyl group are preferable due to enhancement of the electrostatic capacity per unit volume.
$R^1$ to $R^3$ independently represent hydrogen atom or alkyl group having 1 to 6 carbon atoms. The alkyl group having 1 to 6 carbon atoms includes same groups described above. $R^1$ to $R^3$ may be different group each other.
Imidazolium cation includes, for example, 1,3-dimethylimidazolium, 1-ethyl-3-methylimidazolium, 1,3-diethylimidazolium, 1,2,3-trimethylimidazolium, 1,3,4-trimethylimidazolium, 1-ethyl-2,3-dimethylimidazolium, 1-ethyl-3,4-dimethylimidazolium, 1-ethyl-3,5-dimethylimidazolium, 2-ethyl-1,3-dimethylimidazolium, 4-ethyl-1,3-dimethylimidazolium, 1,2-diethyl-3-methylimidazolium, 1,4-diethyl-3-methylimidazolium, 1,5-diethyl-3-methylimidazolium, 1,3-diethyl-2-methylimidazolium, 1,3-diethyl-4-methylimidazolium, 1,2,3-triethylimidazolium, 1,3,4-triethylimidazolium, 1,2,3,4-tetramethylimidazolium, 1-ethyl-2,3,4-trimethylimidazolium, 1-ethyl-2,3,5-trimethylimidazolium, 1-ethyl-3,4,5-trimethylimidazolium, 2-ethyl-1,3,4-trimethylimidazolium, 4-ethyl-1,2,3-trimethylimidazolium, 1,2-diethyl-3,4-dimethylimidazolium, 1,3-diethyl-2,4-dimethylimidazolium, 1,4-diethyl-2,3-dimethylimidazolium, 2,4-diethyl-1,3-dimethylimidazolium, 4,5-diethyl-1,3-dimethylimidazolium, 1,2,3-triethyl-4-methylimidazolium, 1,2,4-triethyl-3-methylimidazolium, 1,2,5-triethyl-3-methylimidazolium, 1,3,4-triethyl-2-methylimidazolium, 1,3,4-triethyl-5-methylimidazolium, 1,4,5-triethyl-3-methylimidazolium and 1,2,3,4,5-pentamethylimidazolium.
Among them, it is preferable to enhance the electrostatic capacity per unit volume that the imidazolium cation is 1-ethyl-3-methylimidazolium ($EMI^+$) represented by the formula (2).

(2)

The cation of the electrolyte used for the electric double-layer capacitor of the present invention may include aliphatic quaternary ammonium cations such as tetraethylammonium, triethylmethylammonium, trimethylpropylammonium, 1-ethyl-1-methylpyrrolidinium and 1-methyl-1-propylpiperidinium.

Content of these cations is usually equal to or less than the molar amount of $EMI^+$.

The counter ion of the electrolyte used for the electric double-layer capacitor of the present invention usually includes $BF_4^-$, $PF_6^-$, $ClO_4^-$, $N(CF_3SO_2)^-$, $CF_3CO_2^-$, and the like. Among them, $CF_3CO_2^-$ and $BF_4^-$ are preferable to enhance the electrostatic capacity per unit volume. The counter ion may be a mixture of different kind of anions.

A solvent dissolving the electrolyte for the electrolytic solution usually applies polar solvent, and specifically includes carbonate containing chain carbonates and cyclic carbonates, the chain carbonates such as dimethyl carbonate, ethylmethyl carbonate, diethyl carbonate, diphenyl carbonate and methylphenyl carbonate; and the cyclic carbonates such as ethylene carbonate, propylene carbonate, ethylene 2,3-dimethylcarbonate, butylene carbonate, vinylene carbonate and ethylene 2-vinylcarbonate;

carboxylates such as methyl formate, methyl acetate, methyl propionate, ethyl acetate, propyl acetate, butyl acetate, amyl acetate, methyl benzoate, ethyl benzoate, γ-butyrolactone, γ-valerolactone and δ-valerolactone;

ethers such as ethyleneglycoldimethyl ether, ethyleneglycoldiethyl ether, ethyleneglycolmonomethyl ether, ethyleneglycolmonoethyl ether, 1,4-dioxane, 1,3-dioxolane, tetrahydrofuran, 2-methyltetrahydrofuran, 2,6-dimethyltetrahydrofuran and tetrahydropyran;

nitriles such as acetonitrile, propionitrile, methoxypropionitrile, glutaronitrile, adiponitrile and 2-methylglutaronitrile;

amides such as N-methylformamide, N-ethylformamide, N,N-dimethylformamide, N,N-dimethylacetamide and N-methylpyrrolidinone;

sulfones such as dimethylsulfone, ethylmethylsulfone, diethylsulfone, sulfolane, 3-methylsulfolane and 2,4-dimethylsulfolane;

sulfoxides such as dimethylsulfoxide, methylethylsulfoxide and diethylsulfoxide;

sulfates such as dimethylsulfate, diethylsulfate, ethylenesulfate and propylenesulfate;

sulfites such as dimethylsulfite, diethylsulfite, ethylenesulfite and propylenesulfite;

phosphates such as trimethylphosphate, ethyldimethylphosphate, diethylmethylphosphate and triethylphosphate; and 1,3-dimethyl-2-imidazolidinone, 1,3-dimethyl-3,4,5,6-tetrahydro-2(1H)-pyrimidinone, 3-methyl-2-oxazolidinone, nitromethane, and the like.

The solvent dissolving the electrolyte may be a mixture of different solvents.

As the solvent dissolving the electrolyte, preferably used are carbonate esters, carboxylates, nitrites, amides and sulfones; and more preferably carbonate esters and carboxylates.

Concentration of the electrolyte in the electrolytic solution is usually 0.5 to 5.0 mole (electrolyte)/L(electrolytic solution), and preferably 0.7 to 3.0 mole (electrolyte)/L (electrolytic solution). When the electrolyte dissolves 0.5 mole/L or more, the electrostatic capacity is preferably enhanced, and when 5.0 mole/L or less, the viscosity of electrolytic solution is preferably reduced.

Water content in the electrolytic solution is usually 200 ppm or less, preferably 50 ppm or less, more preferably 20 ppm or less. By suppressing the water content, influence on the electrode due to water electrolysis, especially reduction of voltage endurance can be avoided.

The activated carbon used in the present invention is an activated carbon produced by carbonizing an organic aerogel obtained by polymerizing a phenolic compound having at least one hydroxyl group in its molecule with an aldehyde compound in the presence of an aqueous solvent and a basic catalyst.

The phenolic compound is a phenolic compound having at least one hydroxyl group in its molecule, and specifically exemplified by a compound represented by the formula (3).

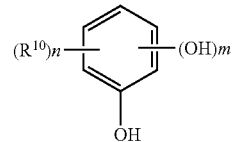

(3)

In the formula, $R^{10}$ represents alkyl group having 1 to 12 carbon atoms optionally coupling with substituent. When $R^{10}$ is plural, $R^{10}$s may be different each other. n represents an integer of 0 to 3, and m represents an integer of 2 to 5; wherein the sum of n and m is 5 or less.

The substituent optionally coupling to the alkyl group includes, for example, halogen atoms, hydroxy group, cyano group, alkoxy group, carbamoyl group, carboxyl group, alkoxycarbonyl group, alkylcarbonyloxy group, sulfo group and sulfamoyl group.

$R^{10}$ may be linear, branched or cyclic.

$R^{10}$ include, for example, alkyl groups such as methyl group, ethyl group, n-propyl group, i-propyl group, n-butyl group, i-butyl group, s-butyl group, n-octyl group, nonyl group and p-t-butyl group;

alkyl groups having hydroxyl group such as 2-hydroxyethyl group, 2-hydroxypropyl group, 3-hydroxypropyl group, 2-hydroxybutyl group, 3-hydroxybutyl group, 4-hydroxybutyl group, 2,3-dihydroxypropyl group and 3,4-dihydroxybutyl group;

alkyl groups having cyano group such as cyanomethyl group, 2-cyanoethyl group and 3-cyanopropyl group; alkyl groups having alkoxy group such as methoxymethyl group, ethoxymethyl group, 2-methoxyethyl group, 2-ethoxyethyl group, 3-methoxypropyl group, 3-ethoxypropyl group and 2-hydroxy-3-methoxypropyl group;

halogenated alkyl groups such as chloromethyl group, bromomethyl group, 2-chloroethyl group, 2-bromoethyl group, 3-chloropropyl group, 3-bromopropyl group, 4-chlorobutyl group and 4-bromobutyl group; and carboxymethyl group, 2-carboxyethyl group, 3-carboxypropyl group, 4-carboxybutyl group, 1,2-dicarboxyethyl group, carbamoylmethyl group, 2-carbamoylethyl group, 3-carbamoylpropyl group, 4-carbamoylbutyl group, methoxycarbonylmethyl group, ethoxycarbonylmethyl group, 2-methoxycarbonylethyl group, 2-ethoxycarbonylethyl group, 3-methoxycarbonylpropyl group, 3-ethoxycarbonylpropyl group, 4-methoxycarbonylbutyl group, 4-ethoxycarbonylbutyl group, methylcarbonyloxymethyl group, ethylcarbonyloxymethyl group, 2-methylcarbonyloxyethyl group, 2-ethylcarbonyloxyethyl group, 3-methylcarbonyloxypropyl group, 3-ethylcarbonyloxypropyl group, 4-methylcarbonyloxybutyl group and 4-ethylcarbonyloxybutyl group.

The carbon number of $R^{10}$ is usually 1 to 12.

$R^{10}$ is preferably hydrogen atom or non-substituted alkyl group, and more preferably hydrogen atom, methyl group, ethyl group or n-octyl group.

In the formula (1), n is preferably 3 or 4, and more preferably 4.

m is preferably 1 or 2, and more preferably 1.

The compound represented by the formula (3) specifically includes o-creosol, m-creosol, p-creosol, 2,3-xylenol, 2,4-xylenol, 2,5-xylenol, 2,6-xylenol, 3,4-xylenol, 3,5-xylenol, o-ethylphenol, i-propylphenol, butylphenol, p-t-butylphenol, p-octylphenol, p-nonylphenol, 2-chlorophenol, 4-methoxyphenol, 2,4-dichlorophenol, 3,5-dichlorophenol, 4-chloro-3-methylphenol, catechol, 3-methylcatechol, 4-t-butylcatechol, resorcinol, 2-methylresorcinol, 4-ethylresorcinol, 4-chlororesorcinol, 5-methylresorcinol, 2,5-dimethylresorcinol, 5-methoxyresorcinol, 5-pentylresorcinol, phloroglucinol and pyrogallol.

The phenolic compounds can be used alone or in admixture of 2 or more.

As the phenolic compound, preferably used are resorcinol or phloroglucinol.

The aldehyde compound used for producing an organic aerogel includes, for example, formaldehyde, paraformaldehyde, acetaldehyde, butylaldehyde, salicylaldehyde and benzaldehyde. Among them, formaldehyde is preferably used.

The use amount of the aldehyde compound is usually about 1 to about 3 moles, preferably about 1.2 to about 2.5 moles, based on 1 mole of phenolic compound.

The basic catalyst used for producing the organic aerogel includes, for example, sodium carbonate, potassium carbonate, lithium carbonate, sodium hydroxide, potassium hydroxide, lithium hydroxide, barium carbonate, sodium phosphate, lithium phosphate and potassium phosphate. Among them, sodium carbonate is preferably used.

The use amount of phenolic compound usually is 0.25 to 10000 moles, preferably 0.25 to 1000 moles, more preferably 1 to 500 moles, based on 1 mole of basic catalyst.

It is preferable to enhance the electrostatic capacity that the use amount of phenolic compound is in the range of 0.25 to 10000 moles per one mole of basic catalyst.

The aqueous solvent used for producing the organic aerogel is meant by water, organic solvents mixable with water in arbitrary ratio or a mixture of water and the organic solvents. The organic solvents specifically include alcohol-based solvents such as methanol, ethanol and i-propylalcohol, and ether-based solvents such as tetrahydrofuran. These solvents may be used alone or in admixture thereof.

Preferably used aqueous solvent is water, an alcohol-based solvent having carbon atoms of 3 or less and a mixture of water and the alcohol-based solvent having carbon atoms of 3 or less, more preferable is water.

The amount ratio of phenol-based compound to aqueous solvent is 0.5 to 5 parts by weight of phenol-based compound, preferably 1 to 2 parts by weight, based on 1 part by weight of aqueous solvent.

It is preferable to enhance the electrostatic capacity per unit volume that the amount ratio of phenol-based compound to aqueous solvent is 0.5 to 5 parts by weight.

In the method of the invention, since the amount of aqueous solvent used is meant by an amount of aqueous solvent used in polymerization, the amounts of aqueous solvent contained in the phenol-based compound and the aldehyde compound are regarded as a part of the aqueous solvent used. For example, if using 37% aqueous formalin solution, the water contained in an amount of 63% in the solution is regarded as a part of aqueous solvent.

Methods for producing the organic aerogel include a method of mixing together a phenol-based compound, an aldehyde compound, a basic catalyst and an aqueous solvent, stirring the mixture usually at 0 to 100° C., preferably at 30 to 90° C. to obtain a wet gel, and then drying the gel obtained; a method of mixing an aldehyde compound with a mixture of a phenol-based compound, a basic catalyst and an aqueous solvent, usually at 0 to 100° C., preferably at 30 to 90° C. to obtain a wet gel, and then drying the gel obtained; a method of mixing a phenol-based compound with a mixture of an aldehyde compound, a basic catalyst and an aqueous solvent, usually at 0 to 100° C., and preferably at 30 to 90° C. to obtain a wet gel and then drying the gel obtained; and a method of mixing a basic catalyst with a mixture of a phenolic compound, an aldehyde compound and an aqueous solvent, usually at 0 to 100° C., preferably at 30 to 90° C. to obtain a wet gel, and then drying the gel obtained.

Among them, preferable is the method of mixing an aldehyde compound with a mixture of a phenol-based compound, a basic catalyst and an aqueous solvent, to obtain a wet gel.

Methods for drying the wet gel are exemplified by ventilating at room temperature to about 100° C. or drying under a reduced pressure. When the solvent contained in the wet gel is water, the water is replaced with a hydrophilic organic solvent, and then the gel is dried by ventilating at room temperature to about 100° C. or drying under a reduced pressure.

The hydrophilic organic solvent described above includes, for example, alcohols such as methyl alcohol, ethyl alcohol, n-propylalcohol and t-butylalcohol; aliphatic nitrites such as acetonitrile; aliphatic ketones such as acetone; aliphatic sulfoxides such as dimethylsulfoxide and aliphatic carboxylic acids such as acetic acid.

Preferably used hydrophilic organic solvent is t-butylalcohol, dimethylsulfoxide and acetic acid. Among them, particularly preferable is t-butylalcohol due to its ability to easily replace water.

As alternative, in place of the methods such as ventilating at room temperature to about 100° C. or drying under a reduced pressure, lyophilization may be applied. The temperature for lyophilization is usually in a range of −70 to 20° C., and preferably of −30 to 10° C. The lyophilization is commonly carried out under vacuum.

Furthermore, as disclosed in Kokai No. H9-328308, the drying may be carried out under supercritical state with carbon dioxide.

The lyophilization is preferable for drying the wet gel because of minimizing fluctuation of pore volumes under drying.

The activated carbon used in the present invention can be obtained by carbonizing and activating a dried organic aerogel. The specific methods for producing the activated carbon include; (I) a method of calcining (carbonizing) under an atmosphere of a gas inert to carbon atom such as nitrogen, argon, helium and hydrogen atoms usually at a temperature range of 200 to 1500° C., preferably 600 to 1100° C., usually for 1 minute to 24 hours, and then calcining (activating) in the presence of an oxidized gas such as $H_2O$, $CO_2$ and $O_2$ usually at a temperature range of 200 to 1500° C., preferably 600 to 1100° C., usually for 1 minute to 10 hours; (II) a method of calcining (carbonizing and activating) in the presence of an oxidized gas usually at a temperature range of 200 to 1500° C., preferably 600 to 1100° C., usually for 1 minute to 24 hours; (III) a method of calcining (carbonizing) compound (1) in the presence of an oxidized gas such as air usually at a temperature of 400° C. or less, preferably 200 to 300° C., usually for 1 minute to 24 hours, then calcining (carbonizing) under an atmosphere of a gas inert to carbon atom usually at a temperature range of 200 to 1500° C., preferably 600 to 1100° C., usually for 1 minute to 24 hours, and then further calcining (activating) in the presence of an oxidized gas at a temperature range of 200 to 1500° C., preferably 600 to 1100° C., usually for 1 minute to 10 hours; (IV) a method of calcining (carbonizing) compound (1) in the presence of an oxidized gas such as air usually at a temperature of 400° C. or less, preferably 200 to 300° C., usually for 1 minute to 24 hours, and then calcining (activating) in the presence of $H_2O$ or $CO_2$ at a temperature range of 200 to 1500° C., preferably 600 to 1100° C., usually for 1 minute to 10 hours; (V) a method of calcining (carbonizing) compound (1) in vacuum usually at a temperature range of 200 to 1500° C., preferably 600 to 1100° C., usually for 1 minute to 24 hours, and then calcining (activating) in the presence of an oxidized gas usually at a temperature range of 200 to 1500° C., preferably 600 to 1100° C., usually for 1 minute to 10 hours; and (VI) a method of mixing zinc chloride, phosphoric acid, potassium sulfide, potassium hydroxide and the like when calcining (carbonizing and activating) under an atmosphere of an oxidized gas in the method (II) described above.

Of these methods, (I) to (V) are preferable due to not containing metal. The oxidized gas is preferably $H_2O$ or $CO_2$.

It is preferable that the calcining temperature is 200° C. or more for enhancing pore volume and the calcining temperature is 1100° C. or less for enhancing the yield of activated carbon. It is also preferable that the calcining time is 1 minute or more for enhancing pore volume and the calcining time is 24 hours or less for enhancing the yield of activated carbon.

The pore volume of the activated carbon used in the present invention is preferably 1.5 cc/g or less, more preferably 0.1 to 1.5 cc/g, further preferably 0.3 to 1.0 cc/g, and particularly preferably 0.3 to 0.6 cc/g. It is preferable to enhance the electrostatic capacity per unit volume when the pore volume of activated carbon is 1.5 cc/g or less.

When the activated carbon having pore volume of 1.5 cc/g or less used for the electric double-layer capacitor of the present invention, the imidazolium salt mentioned above is preferably used as the electrolyte, but other common electrolytes may be applied.

Above described commonly used electrolyte other than the imidazolium salt (1) includes salts of aliphatic quaternary ammonium cation having 4 to 12 carbon atoms.

Among them, preferably used are salts composed of anion and aliphatic quaternary ammonium cation.

The electrolyte includes, for example, a combination of the following inorganic anions and organic cations described below. The anions include $BO_3^{3-}$, $F^-$, $PF_6^-$, $BF_4^-$, $AsF_6^-$, $SbF_6^-$, $ClO_4^-$, $AlF_4^-$, $AlCl_4^-$, $TaF_6^-$, $NbF_6^-$, $SiF_6^{2-}$, $CN^-$ and $F(HF)_n^-$ (wherein n represents an integer of 1 or more and 4 or less); a combination of organic anions described below and the organic cations, and a combination of the organic anions and inorganic cations such as lithium ion, sodium ion, potassium ion, hydrogen ion, and the like.

The organic cation is a cationic organic compound such as organic quaternary ammonium cation and organic quaternary phosphonium cation.

The organic quaternary ammonium cation is meant by a quaternary ammonium cation of which a hydrocarbon group selected from the group consisting of alkyl group (having 1 to 20 carbon atoms), cycloalkyl group (having 6 to 20 carbon atoms), aryl group (having 6 to 20 carbon atoms) and aralkyl group (having 7 to 20 carbon atoms) is substituted with nitrogen atom, and the organic quaternary phosphonium cation is meant by a quaternary phosphonium cation of which the same hydrocarbon groups described above is substituted with phosphorus atom.

The substituted hydrocarbon group may be further coupled with hydroxyl group, amino group, nitro group, cyano group, carboxyl group, ether group, aldehyde group and the like.

The typical organic quaternary ammonium cations and organic quaternary phosphonium cations are exemplified as follows:

(Tetraalkylammonium Cations)
tetramethylammonium, ethyltrimethylammonium, triethylmethylammonium, tetraethylammonium, tetra-n-propylammonium, tetra-n-butylammonium, diethyldimethylammonium, methyltri-n-propylammonium, tri-n-butylmethylammonium, ethyltri-n-butylammonium, tri-n-octylmethylammonium, ethyltri-n-octylammonium, diethylmethyl-i-propylammonium, diethylmethyl-n-propylammonium, ethyldimethyl-i-propylammonium, ethyldimethyl-n-propylammonium, diethylmethylmethoxyethylammonium, dimethylethylmethoxyethylammonium, benzyltrimethylammonium, $(CF_3CH_2)(CH_3)_3N+$, $(CF_3CH_2)_2(CH_3)_2N+$ and the like;

(Ethylenediammonium Cations)
N,N,N',N',N',N'-hexamethylethylenediammonium, N,N'-diethyl-N,N,N',N'-tetramethylethylenediammonium and the like;

(Bicyclic-Ammonium Cation Represented by the Following Formula)

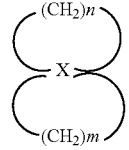

(wherein X represents nitrogen or phosphorus atoms, n and m independently represent an integer of 4 to 6.);

(Guanidinium Cations Having Imidazolium Skelton)
2-dimethylamino-1,3,4-trimethylimidazolium, 2-diethylamino-1,3,4-trimethylimidazolium, 2-diethylamino-1,3-dimethyl-4-ethylimidazolium, 2-dimethylamino-1-methyl-3,4-diethylimidazolium, 2-diethylamino-1-methyl-3,4-diethylimidazolium, 2-diethylamino-1,3,4-triethylimidazolium, 2-dimethylamino-1,3-dimethylimidazolium, 2-diethylamino-1,3-dimethylimidazolium, 2-dimethylamino-1-ethyl-3-methylimidazolium, 2-diethylamino-1,3-diethylimidazolium, 1,5,6,7-tetrahydro-1,2-dimethyl-12H-0imide[1,2a]imidazolium, 1,5-dihydro-1,2-dimethyl-2H-imide[1,2a]imidazolium, 1,5,6,7-tetrahydro-1,2-dimethyl-2H-pyrimido[1,2a]imidazolium, 1,5-dihydro-1,2-dimethyl-2H-pyrimido[1,2a]imidazolium, 2-dimethylamino-4-cyano-1,3-dimethylimidazolium, 2-dimethylamino-3-cyanomethyl-1-methylimidazolium, 2-dimethylamino-4-acetyl-1,3-dimethylimidazolium, 2-dimethylamino-3-acetylmethyl-1-methylimidazolium, 2-dimethylamino-4-methylcarbo-oxymethyl-1,3-dimethylimidazolium, 2-dimethylamino-3-methylcarbo-oxymethyl-1-methylimidazolium, 2-dimethylamino-4-methoxy-1,3-dimethylimidazolium, 2-dimethylamino-3-methoxymethyl-1-methylimidazolium, 2-dimethylamino-4-formyl-1,3-dimethylimidazolium, 2-dimethylamino-3-formylmethyl-1-methylimidazolium, 2-dimethylamino-3-hydroxyethyl-1-methylimidazolium, 2-dimethylamino-4-hydroxymethyl-1,3-dimethylimidazolium and the like;

(Guanidinium Cations Having Imidazolium Skelton)

2-dimethylamino-1,3,4-trimethylimidazolium, 2-diethylamino-1,3,4-trimethylimidazolium, 2-diethylamino-1,3-dimethyl-4-ethylimidazolium, 2-dimethylamino-1-methyl-3,4-diethylimidazolium, 2-diethylamino-1-methyl-3,4-diethylimidazolium, 2-diethylamino-1,3,4-triethylimidazolium, 2-dimethylamino-1,3-dimethylimidazolium, 2-diethylamino-1,3-dimethylimidazolium, 2-dimethylamino-1-ethyl-3-methylimidazolium, 2-diethylamino-1,3-diethylimidazolium, 1,5,6,7-tetrahydro-1,2-dimethyl-2H-imide[1,2a]imidazolium, 1,5-dihydro-1,2-dimethyl-2H-imide[1,2a]imidazolium, 1,5,6,7-tetrahydro-1,2-dimethyl-2H-pyrimido[1,2a]imidazolium, 1,5-dihydro-1,2-dimethyl-2H-pyrimido[1,2a]imidazolium, 2-dimethylamino-4-cyano-1,3-dimethylimidazolium, 2-dimethylamino-3-cyanomethyl-1-methylimidazolium, 2-dimethylamino-4-acetyl-1,3-dimethylimidazolium, 2-dimethylamino-3-acetylmethyl-1-methylimidazolium, 2-dimethylamino-4-methylcarbo-oxymethyl-1,3-dimethylimidazolium, 2-dimethylamino-3-methylcarbo-oxymethyl-1-methylimidazolium, 2-dimethylamino-4-methoxy-1,3-dimethylimidazolium, 2-dimethylamino-3-methoxymethyl-1-methylimidazolium, 2-dimethylamino-4-formyl-1,3-dimethylimidazolium, 2-dimethylamino-3-formylmethyl-1-methylimidazolium, 2-dimethylamino-3-hydroxyethyl-1-methylimidazolium, 2-dimethylamino-4-hydroxymethyl-1,3-dimethylimidazolium and the like;

(Guanidinium Cations Having Tetrahydropyrimidinium Skelton)

2-dimethylamino-1,3,4-trimethyl-1,4,5,6-tetrahydropyrimidinium, 2-diethylamino-1,3,4-trimethyl-1,4,5,6-tetrahydropyrimidinium, 2-diethylamino-1,3-dimethyl-4-ethyl-1,4,5,6-tetrahydropyrimidinium, 2-dimethylamino-1-methyl-3,4-diethyl-1,4,5,6-tetrahydropyrimidinium, 2-diethylamino-1-methyl-3,4-diethyl-1,4,5,6-tetrahydropyrimidinium, 2-diethylamino-1,3,4-tetraethyl-1,4,5,6-tetrahydropyrimidinium, 2-dimethylamino-1,3-dimethyl-1,4,5,6-tetrahydropyrimidinium, 2-diethylamino-1,3-dimethyl-1,4,5,6-tetrahydropyrimidinium, 2-dimethylamino-1-ethyl-3-methyl-1,4,5,6-tetrahydropyrimidinium, 2-diethylamino-1,3-diethyl-1,4,5,6-tetrahydropyrimidinium, 1,3,4,6,7,8-hexahydro-1,2-dimethyl-2H-imide[1,2a]pyrimidinium, 1,3,4,6-tetrahydro-1,2-dimethyl-2H-imide[1,2a]pyrimidinium, 1,3,4,6,7,8-hexahydro-1,2-dimethyl-2H-pyrimido[1,2a]pyrimidinium, 1,3,4,6-tetrahydro-1,2-dimethyl-2H-pyrimido[1,2a]pyrimidinium, 2-dimethylamino-4-cyano-1,3-dimethyl-1,4,5,6-tetrahydropyrimidinium, 2-dimethylamino-3-cyanomethyl-1-methyl-1,4,5,6-tetrahydropyrimidinium, 2-dimethylamino-4-acetyl-1,3-dimethyl-1,4,5,6-tetrahydropyrimidinium, 2-dimethylamino-3-acetylmethyl-1-methyl-1,4,5,6-tetrahydropyrimidinium, 2-dimethylamino-4-methylcarbo-oxymethyl-1,3-dimethyl-1-1,4,5,6-tetrahydropyrimidinium, 2-dimethylamino-3-methylcarbo-oxymethyl-1-methyl-1,4,5,6-tetrahydropyrimidinium, 2-dimethylamino-4-methoxy-1,3-dimethyl-1,4,5,6-tetrahydropyrimidinium, 2-dimethylamino-3-methoxymethyl-1-methyl-1,4,5,6-tetrahydropyrimidinium, 2-dimethylamino-4-formyl-1,3-dimethyl-1,4,5,6-tetrahydropyrimidinium, 2-dimethylamino-3-formylmethyl-1-methyl-1,4,5,6-tetrahydropyrimidinium, 2-dimethylamino-3-hydroxyethyl-1-methyl-1,4,5,6-tetrahydropyrimidinium, 2-dimethylamino-4-hydroxymethyl-1,3-dimethyl-1,4,5,6-tetrahydropyrimidinium and the like;

(Guanidinium Cations Having Dihydropyrimidinium Skelton)

2-dimethylamino-1,3,4-trimethyl-1,4(6)-dihydropyrimidinium, 2-diethylamino-1,3,4-trimethyl-1,4(6)-dihydropyrimidinium, 2-diethylamino-1,3-dimethyl-4-ethyl-1,4(6)-dihydropyrimidinium, 2-dimethylamino-1-methyl-3,4-diethyl-1,4(6)-dihydropyrimidinium, 2-diethylamino-1-methyl-3,4-diethyl-1,4(6)-dihydropyrimidinium, 2-diethylamino-1,3,4-tetraethyl-1,4(6)-dihydropyrimidinium, 2-dimethylamino-1,3-dimethyl-1,4(6)-dihydropyrimidinium, 2-diethylamino-1,3-dimethyl-1,4(6)-dihydropyrimidinium, 2-dimethylamino-1-ethyl-3-methyl-1,4(6)-dihydropyrimidinium, 2-diethylamino-1,3-diethyl-1,4(6)-dihydropyrimidinium, 1,6,7,8-tetrahydro-1,2-dimethyl-2H-imide[1,2a]pyrimidinium, 1,6-dihydro-1,2-dimethyl-2H-imide[1,2a]pyrimidinium, 1,6,7,8-tetrahydro-1,2-dimethyl-2H-pyrimido[1,2a]pyrimidinium, 1,6-dihydro-1,2-dimethyl-2H-pyrimido[1,2a]pyrimidinium, 2-dimethylamino-4-cyano-1,3-dimethyl-1,4(6)-dihydropyrimidinium, 2-dimethylamino-3-cyanomethyl-1-methyl-1,4(6)-dihydropyrimidinium, 2-dimethylamino-4-acetyl-1,3-dimethyl-1,4(6)-dihydropyrimidinium, 2-dimethylamino-3-acetylmethyl-1-methyl-1,4(6)-dihydropyrimidinium, 2-dimethylamino-4-methylcarbo-oxymethyl-1,3-dimethyl-1-1,4(6)-dihydropyrimidinium, 2-dimethylamino-3-methylcarbo-oxymethyl-1-methyl-1,4(6)-dihydropyrimidinium, 2-dimethylamino-4-methoxy-1,3-dimethyl-1,4(6)-dihydropyrimidinium, 2-dimethylamino-3-methoxymethyl-1-methyl-1,4(6)-dihydropyrimidinium, 2-dimethylamino-4-formyl-1,3-dimethyl-1,4,5,6-tetrahydropyrimidinium, 2-dimethylamino-3-formylmethyl-1-methyl-1,4,5,6-tetrahydropyrimidinium, 2-dimethylamino-3-hydroxyethyl-1-methyl-1,4,5,6-tetrahydropyrimidinium, 2-dimethylamino-4-hydroxymethyl-1,3-dimethyl-1,4(6)-dihydropyrimidinium and the like;

(Pyrrolidinium Cations)

N,N-dimethylpyrrolidinium, N-ethyl-N-methylpyrrolidinium, N-n-propyl-N-methylpyrrolidinium, N-n-butyl-N-methylpyrrolidinium, N,N-diethylpyrrolidinium, spiro-(1,1')-bipyrrolidinium and the like;

(Piperidinium Cations)

N,N-dimethylpiperidinium, N-ethyl-N-methylpiperidinium, N,N-diethylpiperidinium, N-n-propyl-N-methylpiperidinium, N-n-butyl-N-methylpiperidinium, N-ethyl-N-n-butylpiperidinium and the like;

(Hexamethyleneiminium Cations)

N,N-dimethylhexamethyleneiminium, N-ethyl-N-methylhexamethyleneiminium, N,N-diethylhexamethyleneiminium and the like;

(Morpholinium Cations)

N,N-dimethylmorpholinium, N-ethyl-N-methylmorpholinium, N-butyl-N-methylmorpholinium, N-ethyl-N-butylmorpholinium and the like;

(Piperazinium Cations)

N,N,N',N'-tetramethyl piperazinium, N-ethyl-N,N',N'-trimethyl piperazinium, N,N'-diethyl-N,N'-dimethylpiperazinium, N,N,N'-triethyl-N'-methyl piperazinium, N,N,N',N'-tetraethylpiperazinium and the like;

(Tetrahydropyrimidinium Cations)

1,3-dimethyl-1,4,5,6-tetrahydropyrimidinium, 1,2,3-trimethyl-1,4,5,6-tetrahydropyrimidinium, 1,3,4-trimethyl-1,4,5,6-tetrahydropyrimidinium, 1,3,5-trimethyl-1,4,5,6-tetrahydropyrimidinium, 1-ethyl-2,3-dimethyl-1,4,5,6-tetrahydropyrimidinium, 1-ethyl-3,4-dimethyl-1,4,5,6-tetrahydropyrimidinium, 1-ethyl-3,5-dimethyl-1,4,5,6-tetrahydropyrimidinium, 1-ethyl-3,6-dimethyl-1,4,5,6-tetrahydropyrimidinium, 2-ethyl-1,3-dimethyl-1,4,5,6-tetrahydropyrimidinium, 4-ethyl-1,3-dimethyl-1,4,5,6-tetrahydropyrimidinium, 5-ethyl-1,3-dimethyl-1,4,5,6-tetrahydropyrimidinium, 1,2,3,4-tetramethyl-1,4,5,6-tetrahydropyrimidinium, 1,2,3,5-tetramethyl-1,4,5,6-tetrahydropyrimidinium, 8-methyl-1,8-diazabicyclo[5.4.0]-7-undecenium, 5-methyl-1,5-diazabicyclo[4.3.0]-5-nonenium, 8-ethyl-1,8-diazabicyclo[5.4.0]-7-undecenium, 5-ethyl-1,5-diazabicyclo[4.3.0]-5-nonenium, 5-methyl-1,5-diazabicyclo[5.4.0]-5-undecenium, 5-ethyl-1,5-diazabicyclo[5.4.0]-5-undecenium, 1,2,3,4-tetramethyl-1,4,5,6-tetrahydropyrimidinium, 1,2,3,5-tetramethyl-1,4,5,6-tetrahydropyrimidinium, 1-ethyl-2,3,4-trimethyl-1,4,5,6-tetrahydropyrimidinium, 1-ethyl-2,3,5-trimethyl-1,4,5,6-tetrahydropyrimidinium, 1-ethyl-2,3,6-trimethyl-1,4,5,6-tetrahydropyrimidinium, 2-ethyl-1,3,4-trimethyl-1,4,5,6-tetrahydropyrimidinium, 2-ethyl-1,3,5-trimethyl-1,4,5,6-tetrahydropyrimidinium, 4-ethyl-1,2,3-trimethyl-1,4,5,6-tetrahydropyrimidinium, 4-ethyl-1,3,5-trimethyl-1,4,5,6-tetrahydropyrimidinium, 4-ethyl-1,3,6-trimethyl-1,4,5,6-tetrahydropyrimidinium, 5-ethyl-1,2,3-trimethyl-1,4,5,6-tetrahydropyrimidinium, 5-ethyl-1,3,4-trimethyl-1,4,5,6-tetrahydropyrimidinium, 1,2-diethyl-3,4-dimethyl-1,4,5,6-tetrahydropyrimidinium, 1,2-diethyl-3,5-dimethyl-1,4,5,6-tetrahydropyrimidinium, 1,2-diethyl-3,6-dimethyl-1,4,5,6-tetrahydropyrimidinium, 1,3-diethyl-2,4-dimethyl-1,4,5,6-tetrahydropyrimidinium, 1,3-diethyl-2,5-dimethyl-1,4,5,6-tetrahydropyrimidinium, 1,4-diethyl-2,3-dimethyl-1,4,5,6-tetrahydropyrimidinium, 1,4-diethyl-3,5-dimethyl-1,4,5,6-tetrahydropyrimidinium, 1,4-diethyl-3,6-dimethyl-1,4,5,6-tetrahydropyrimidinium, 1,5-diethyl-2,3-dimethyl-1,4,5,6-tetrahydropyrimidinium, 1,5-diethyl-3,4-dimethyl-1,4,5,6-tetrahydropyrimidinium, 1,5-diethyl-3,6-dimethyl-1,4,5,6-tetrahydropyrimidinium, 2,4-diethyl-1,3-dimethyl-1,4,5,6-tetrahydropyrimidinium, 2,5-diethyl-1,3-dimethyl-1,4,5,6-tetrahydropyrimidinium, 4,5-diethyl-1,3-dimethyl-1,4,5,6-tetrahydropyrimidinium, 4,6-diethyl-1,3-dimethyl-1,4,5,6-tetrahydropyrimidinium, 1,2,3,4,5-pentamethyl-1,4,5,6-tetrahydropyrimidinium, 1,2,3,4,6-pentamethyl-1,4,5,6-tetrahydropyrimidinium, 1,2,3,4,5,6-hexamethyl-1,4,5,6-tetrahydropyrimidinium, 4-cyano-1,2,3-trimethyl-1,4,5,6-tetrahydropyrimidinium, 3-cyanomethyl-1,2-dimethyl-1,4,5,6-tetrahydropyrimidinium, 2-cyanomethyl-1,3-dimethyl-1,4,5,6-tetrahydropyrimidinium, 4-acetyl-1,2,3-trimethyl-1,4,5,6-tetrahydropyrimidinium, 3-acetylmethyl-1,2-dimethyl-1,4,5,6-tetrahydropyrimidinium, 4-methylcarbo-oxymethyl-1,2,3-trimethyl-1,4,5,6-tetrahydropyrimidinium, 3-methylcarbo-oxymethyl-1,2-dimethyl-1,4,5,6-tetrahydropyrimidinium, 4-methoxy-1,2,3-trimethyl-1,4,5,6-tetrahydropyrimidinium, 3-methoxymethyl-1,2-dimethyl-1,4,5,6-tetrahydropyrimidinium, 4-formyl-1,2,3-trimethyl-1,4,5,6-tetrahydropyrimidinium, 3-formylmethyl-1,2-dimethyl-1,4,5,6-tetrahydropyrimidinium, 3-hydroxyethyl-1,2-dimethyl-1,4,5,6-tetrahydropyrimidinium, 4-hydroxymethyl-1,2,3-trimethyl-1,4,5,6-tetrahydropyrimidinium, 2-hydroxyethyl-1,3-dimethyl-1,4,5,6-tetrahydropyrimidinium and the like;

(Dihydropyrimidinium Cations)

1,3-dimethyl-1,4- or -1,6-dihydropyrimidinium [which are collectively expressed with "1,3-dimethyl-1,4(6)-dihydropyrimidinium", and hereinafter this expression manner being applied to in the same meaning], 1,2,3-trimethyl-1,4(6)-dihydropyrimidinium, 1,2,3,4-tetramethyl-1,4(6)-dihydropyrimidinium, 1,2,3,5-tetramethyl-1,4(6)-dihydropyrimidinium, 8-methyl-1,8-diazabicyclo[5,4,0]-7,9(10)-undecadienium, 5-methyl-1,5-diazabicyclo[4,3,0]-5,7(8)-nonadienium, 4-cyano-1,2,3-trimethyl-1,4(6)-dihydropyrimidinium, 3-cyanomethyl-1,2-dimethyl-1,4(6)-dihydropyrimidinium, 2-cyanomethyl-1,3-dimethyl-1,4(6)-dihydropyrimidinium, 4-acetyl-1,2,3-trimethyl-1,4(6)-dihydropyrimidinium, 3-acetylmethyl-1,2-dimethyl-1,4(6)-dihydropyrimidinium, 4-methylcarbo-oxymethyl-1,2,3-trimethyl-1,4(6)-dihydropyrimidinium, 3-methylcarbo-oxymethyl-1,2-dimethyl-1,4(6)-dihydropyrimidinium, 4-methoxy-1,2,3-trimethyl-1,4(6)-dihydropyrimidinium, 3-methoxymethyl-1,2-dimethyl-1,4(6)-dihydropyrimidinium, 4-formyl-1,2,3-trimethyl-1,4(6)-dihydropyrimidinium, 3-formylmethyl-1,2-dimethyl-1,4(6)-dihydropyrimidinium, 3-hydroxyethyl-1,2-dimethyl-1,4(6)-dihydropyrimidinium, 4-hydroxymethyl-1,2,3-trimethyl-1,4(6)-dihydropyrimidinium, 2-hydroxyethyl-1,3-dimethyl-1,4(6)-hydropyrimidinium and cations in which a secondary hydrogen atom of the dihydropyrimidinium-based cations described above is replaced with fluorine atom and the like;

1,3,4,6,7,8-hexahydro-1,2-dimethyl-2H-pyrimido[1,2a]pyrimidinium;

(Pyridinium Cations)

N-methylpyridinium, N-ethylpyridinium, N-n-propylpyridinium, N-n-butylpyridinium, N-methyl-4-methylpyridinium, N-ethyl-4-methylpyridinium, N-n-propyl-4-methylpyridinium, N-n-butyl-4-methylpyridinium, N-methyl-3-methylpyridinium, N-ethyl-3-methylpyridinium, N-n-propyl-3-methylpyridinium, N-n-butyl-3-methylpyridinium, N-methyl-2-methylpyridinium, N-ethyl-2-methylpyridinium, N-n-propyl-2-methylpyridinium, N-n-butyl-2-methylpyridinium, N-methyl-2,4-dimethylpyridinium, N-ethyl-2,4-dimethylpyridinium, N-n-propyl-2,4-dimethylpyridinium, N-n-butyl-2,4-dimethylpyridinium, N-methyl-3,5-dimethylpyridinium, N-ethyl-3,5-dimethylpyridinium, N-n-propyl-3,5-dimethylpyridinium, N-n-butyl-3,5-dimethylpyridinium, N-methyl-4-dimethylaminopyridinium, N-ethyl-4-dimethylaminopyridinium, N-n-propyl-4-dimethylaminopyridinium, N-n-butyl-4-dimethylaminopyridinium and the like;

(Picolinium Cation)

N-methylpicolinium, N-ethylpicolinium and the like;

(Imidazolium-Based Cations)

1,2,3-trimethylimidazolium, 1,2,3,4-tetramethylimidazolium, 1,3,4-trimethyl-2-ethylimidazolium, 1,3-dimethyl-2,4-diethylimidazolium, 1,2-dimethyl-3,4-diethylimidazolium, 1-methyl-2,3,4-triethylimidazolium, 1,2,3,4-tetraethylimidazolium, 1,3-dimethyl-2-ethylimidazolium, 1-ethyl-2,3-dimethylimidazolium, 1,2,3-triethylimidazolium, 1,1-dimethyl-2-heptylimidazolium, 1,1-dimethyl-2-(2'-heptyl)imidazolium, 1,1-dimethyl-2-(3'-heptyl)imidazolium, 1,1-dimethyl-2-(4'-heptyl)imidazolium, 1,1-dimethyl-2-dodecylimidazolium, 1,1-dimethylimidazolium, 1,1,2-trimethylimidazolium, 1,1,2,4-tetramethylimidazolium, 1,1,2,5-tetramethylimidazolium, 1,1,2,4,5-pentamethylimidazolium, 1,2,3-trimethylimidazolium, 1,3,4-trimethylimidazolium, 1,2,3,4-tetramethylimidazolium, 1,2,3,4-tetraethylimidazolium, 1,2,3,5-pentamethylimidazolium, 1,3-dimethyl-2-ethylimidazolium, 1-ethyl-2,3-dimethylimidazolium, 1-ethyl-3,4-dimethylimidazolium, 1-ethyl-3,5-dimethylimidazolium, 4-ethyl-1,3-dimethylimidazolium, 1,2-diethyl-3-methylimidazolium, 1,4-diethyl-3-methylimidazolium, 1,5-diethyl-3-methylimidazolium, 1,3-diethyl-2-methylimidazolium, 1,3-diethyl-4-methylimidazolium, 1,2,3-triethylimidazolium, 1-ethyl-2,3,4-trimethylimidazolium, 1-ethyl-2,3,5-trimethylimidazolium, 1-ethyl-3,4,5-trimethylimidazolium, 2-ethyl-1,3,4-trimethylimidazolium, 4-ethyl-1,2,3-trimethylimidazolium, 1,2-diethyl-3,4-dimethylimidazolium, 1,3-diethyl-2,4-dimethylimidazolium, 1,4-diethyl-2,3-dimethylimidazolium, 2,4-diethyl-1,3-dimethylimidazolium, 4,5-diethyl-1,3-dimethylimidazolium, 3,4-diethyl-1,2-dimethylimidazolium, 1,2,3-triethyl-4-methylimidazolium, 1,2,4-triethyl-3-methylimidazolium, 1,2,5-triethyl-3-methylimidazolium, 1,3,4-triethyl-2-methylimidazolium, 1,3,4-triethyl-5-methylimidazolium, 1,4,5-triethyl-3-methylimidazolium, 2,3,4-triethyl-1-methylimidazolium, 4-cyano-1,2,3-trimethylimidazolium, 3-cyanomethyl-1,2-dimethylimidazolium, 2-cyanomethyl-1,3-dimethylimidazolium, 4-acetyl-1,2,3-trimethylimidazolium, 3-acetylmethyl-1,2-dimethylimidazolium, 4-methylcarbo-oxymethyl-1,2,3-trimethylimidazolium, 3-methylcarbo-oxymethyl-1,2-dimethylimidazolium, 4-methoxy-1,2,3-trimethylimidazolium, 3-methoxymethyl-1,2-dimethylimidazolium, 4-formyl-1,2,3-trimethylimidazolium, 3-formylmethyl-1,2-dimethylimidazolium, 3-hydroxyethyl-1,2-dimethylimidazolium, 4-hydroxymethyl-1,2,3-trimethylimidazolium, 2-hydroxyethyl-1,3-dimethylimidazolium and compounds in which a secondary hydrogen atom of the imidazolium-based cations described above is replaced with fluorine atom;

(Quinolinium Cation)
N-methylquinolinium, N-ethylquinoliniumand and the like;
(Bipyridinium Cation)
N-methyl-2,2'-bipyridinium, N-ethyl-2,2'-bipyridinium and the like;
(Other Ammonium Cations)
N-methylthiazolium, N-ethylthiazolium, N-methyloxazolium, N-ethyloxazolium, N-methyl-4-methylthiazolium, N-ethyl-4-methylthiazolium, N-ethylisothiazolium, 1,4-dimethyl-1,2,4-triazolium, 1,4-diethyl-1,2,4-triazolium, 1-methyl-4-ethyl-1,2,4-triazolium, 1-ethyl-4-methyl-1,2,4-triazolium, 1,2-dimethylpyrazolium, 1,2-diethylpyrazolium, 1-methyl-2-ethylpyrazolium, N-methylpyrazinium, N-ethylpyrazinium, N-methylpyridazinium, N-ethylpyridazinium and the like; and
(Tetraalkylphosphonium Cations)
tetramethylphosphonium, ethyltrimethylphosphonium, triethylmethylphosphonium, tetraethylphosphonium, diethyldimethylphosphonium, trimethyl-n-propylphosphonium, trimethylisopropylphosphonium, ethyldimethyl-n-propylphosphonium, ethyldimethylisopropylphosphonium, diethylmethyl-n-propylphosphonium, diethylmethylisopropylphosphonium, dimethyldi-n-propylphosphonium, dimethyl-n-propylisopropylphosphonium, dimethyldiisopropylphosphonium, triethyl-n-propylphosphonium, n-butyltrimethylphosphonium, isobutyltrimethylphosphonium, t-butyltrimethylphosphonium, triethylisopropylphosphonium, ethylmethyldi-n-propylphosphonium, ethylmethyl-n-propylisopropylphosphonium, ethylmethyldiisopropylphosphonium, n-butylethyldimethylphosphonium, isobutylethyldimethylphosphonium, t-butylethyldimethylphosphonium, diethyldi-n-propylphosphonium, diethyl-n-propylisopropylphosphonium, diethyldiisopropylisopropylphosphonium, methyltri-n-propylphosphonium, methyldi-n-propylisopropylphosphonium, methyl-n-propyldiisopropylphosphonium, n-butyltriethylphosphonium, isobutyltriethylphosphonium, t-butyltriethylphosphonium, di-n-butyldimethylphosphonium, diisobutyldimethylphosphonium, di-t-butyldimethylphosphonium, n-butylisobutyldimethylphosphonium, n-butyl-t-butyldimethylphosphonium, isobutyl-t-butyldimethylphosphonium, tri-n-octylmethylphosphonium, ethyltri-n-octylphosphonium and the like.

The organic anion is an anion containing hydrocarbon group optionally having substituent, for example, includes an anion selected from the group consisting of $N(SO_2R_f)_2^-$, $C(SO_2R_f)_3^-$, $R_fCOO^-$ and $R_fSO_3^-$ (wherein $R_f$ represents perfluoroalkyl group having 1 to 12 carbon atoms) and anions in which an active hydrogen is eliminated from the following organic acids (carboxylic acids, organic sulfonic acids and organic phosphoric acids) or phenols.

(Carboxylic Acids)
For example, two to four valent polycarboxylic acids having 2 to 15 carbon atoms such as aliphatic polycarboxylic acids [saturated polycarboxylic acids (oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, methylmalonic acid, ethylmalonic acid, propylmalonic acid, butylmalonic acid, pentylmalonic acid, hexylmalonic acid, dimethylmalonic acid, diethylmalonic acid, methylpropylmalonic acid, methylbutylmalonic acid, ethylpropylmalonic acid, dipropylmalonic acid, methylsuccinic acid, ethylsuccinic acid, 2,2-dimethylsuccinic acid, 2,3-dimethylsuccinic acid, 2-methylglutaric acid, 3-methylglutaric acid, 3-methyl-3-ethylglutaric acid, 3,3-diethylglutaric acid, methylsuccinic acid, 2-methylglutaric acid, 3-methylglutaric acid, 3,3-dimethylglutaric acid, 3-methyladipic acid and the like); and unsaturated polycarboxylic acids (cyclobutene-1,2-dicarboxylic acid, 4-methylcyclobutene-1,2-dicarboxylic acid, cyclopentene-1,2-dicarboxylic acid, 5-methyl-cyclopentene-1,2-dicarboxylic acid, bicyclo[2,2,1]hepta-2-en-2,3-dicarboxylic acid, 1-methyl-bicyclo[2,2,1]hepta-2-en-2,3-dicarboxylic acid, 6-methyl-bicyclo[2,2,1]hepta-2-en-2,3-dicarboxylic acid, bicyclo[2,2,1]hepta-2,5-diene-2,3-dicarboxylic acid, 1-methyl-bicyclo[2,2,1]hepta-2,5-diene-2,3-dicarboxylic acid, 6-methyl-bicyclo[2,2,1]hepta-2,5-diene-2,3-dicarboxylic acid, furan-2,3-dicarboxylic acid, 5-methyl-furan-2,3-dicarboxylic acid, 4-methyl-furan-2,3-dicarboxylic acid, 4,5-dihydroxy-furan-2,3-dicarboxylic acid, 4,5-dihydroxy-4-methyl-furan-2,3-dicarboxylic acid, 4,5-dihydroxy-5-methyl-furan-2,3-dicarboxylic acid, 2,5-dihydroxy-furan-3,4-dicarboxylic acid, 2,5-dihydroxy-2-methyl-furan-3,4-dicarboxylic acid and the like; of these, preferable being cyclobutene-1,2-dicarboxylic acid, 4-methyl-cyclobutene-1,2-dicarboxylic acid, cyclopentene-1,2-dicarboxylic acid, 5-methyl-cyclopentene-1,2-dicarboxylic acid, bicyclo[2,2,1]hepta-2-en-2,3-dicarboxylic acid, bicyclo[2,2,1]hepta-2,5-diene-2,3-dicarboxylic acid, furan-2,3-dicarboxylic acid, 5-methyl-furan-2,3-dicarboxylic acid, 4-methyl-furan-2,3-dicarboxylic acid, 5-methyl-2,3-furandicarboxylic acid, 4,5-dihydroxy-furan-2,3-dicarboxylic acid, 2,5-dihydroxy-furan-3,4-dicarboxylic acid, maleic acid, fumaric acid, itaconic acid, citraconic acid, 1,2-cyclobutadiene-1,2-dicarboxylic acid, 4-methyl-1,2-cyclobutadiene-1,2-dicarboxylic acid, 1,2-cyclopentadiene-1,2-dicarboxylic acid, 5-methyl-1,2-cyclopentadiene-1,2-dicarboxylic acid, 1,2-cyclohexadiene-1,2-dicarboxylic acid, 6-methyl-1,2-cyclohexadiene-1,2-dicarboxylic acid, 5-methyl-1,2-cyclohexadiene-1,2-dicarboxylic acid, furan-3,4-dicarboxylic acid and 2-methyl-furan-3,4-dicarboxylic acid; of these more preferable being 1,2-cyclobutadiene-1,2-dicarboxylic acid, 4-methyl-1,2-cyclobutadiene-1,2-dicarboxylic acid, 1,2-cyclopentadiene-1,2-dicarboxylic acid, 5-methyl-1,2-cyclopentadiene-1,2-dicarboxylic acid, furan-3,4-dicarboxylic acid and 2-methyl-3,4-furandicarboxylic acid)], aromatic polycarboxylic acids [phthalic acid, isophthalic acid, terephthalic acid, trimellitic acid, pyromellitic acid and the like] and polycarboxylic acids containing sulfur atom [thiodipropionic acid and the like];

oxycarboxylic acids having 2 to 20 carbon atoms such as aliphatic oxycarboxylic acids [glycolic acid, lactic acid, tartaric acid, castor oil fatty acid and the like]; and aromatic oxycarboxylic acids [salicylic acid, mandelic acid, 4-hydroxybenzoic acid, 1-hydroxy-2-naphthoic acid, 3-hydroxy-2-naphthoic acid, 6-hydroxy-2-naphthoic acid and the like]; and monocarboxylic acids having 1 to 30 carbon atoms such as aliphatic monocarboxylic acids [saturated monocarboxylic acids (formic acid, acetic acid, propionic acid, butyric acid, isobutyric acid, valeric acid, capric acid, enanthic acid, capric acid, pelargonic acid, lauric acid, myristic acid, stearic acid, behenic acid, undecanoic acid and the like), unsaturated monocarboxylic acids (acrylic acid, methacrylic acid, crotonic acid, oleic acid, squaric acid, 4,5-dihydroxy-4-cyclopentene-1,3-dione, 2,3-dihydroxy-2-cyclohexene-1,4-dione and the like)]; and aromatic monocarboxylic acids [benzoic acid, cinnamic acid, naphthoic acid, toluic acid, ethylbenzoic acid, propylbenzoic acid, isopropylbenzoic acid, butylbenzoic acid, isobutylbenzoic acid, secondary-butylbenzoic acid, tertiary-butylbenzoic acid, hydroxybenzoic acid, ethoxybenzoic acid, propoxybenzoic acid, isopropoxybenzoic acid, butoxybenzoic acid, isobutoxybenzoic acid, secondary-butoxybenzoic acid, tertiary-butoxybenzoic acid, aminobenzoic acid, N-methylaminobenzoic acid, N-ethylaminobenzoic acid, N-propylaminobenzoic acid, N-isopropylaminobenzoic acid, N-butylaminobenzoic acid, N-isobutylaminobenzoic acid, N-secondary-butylaminobenzoic acid, N-tertiary-butylaminobenzoic acid, N,N-dimethylaminobenzoic acid, N,N-diethylaminobenzoic acid, nitrobenzoic acid, florobenzoic acid and the like].

(Phenols)

For example, monophenols (including phenols and naphthols): phenol, alkyl(1 to 15 carbon atoms) phenols (cresol, xylenol, ethylphenol, n- or iso-propylphenol, isododecylphenol and the like), methoxyphenols (eugenol, guaiacol and the like), a-naphthol, β-naphthol, cyclohexylphenol and the like); and polyphenols: catechol, resorcin, pyrogallol, phloroglucine, bisphenol A, bisphenol F, bisphenol S and the like.

(Phosphates Having in its Molecule 1 or 2 Alkyl Groups Having 1 to 15 Carbon Atoms)

For example, mono- and di-methylphosphate, mono- and di-isopropylphosphate, mono- and di-butylphosphate, mono- and di-(2-ethylhexyl)phosphate, mono- and di-isodecylphosphate and the like.

(Organic Sulfonic Acids)

For example, alkyl(1 to 15 carbon atoms)benzenesulfonic acids (p-toluenesulfonic acid, nonylbenzenesulfonic acid, dodecylbenzenesulfonic acid and the like), sulfosalicylic acid, methanesulfonic acid, trifloromethanesulfonic acid and the like.

(Organic Acids Having Triazole- or Tetrazole-Based Structure)

For example, 1-H-1,2,4-triazole, 1,2,3-triazole, 1,2,3-benzotriazole, carboxybenzotriazole, 3-mercapto-1,2,4-triazole, 1,2,3-triazole-4,5-dicarboxylic acid, 3-mercapto-5-methyl-1,2,4-triazole, 1,2,3,4-tetrazole and the like.

(Organic Acids Containing Boron Atom)

borodioxalate, borodiglycolate, borodi(2-hydroxyisobutyrate), alkane borates, aryl borates, methane borate, ethane borate, phenyl borates and the like.

Anions represented by the following formula

wherein k represents an integer of 1 to 4 and $R_f$ represents the same meaning mentioned above.

trifluoromethyltrifluoro borate, bis(trifluoromethyl)difluoro borate, tris(trifluoromethyl)fluoro borate, tetrakis(trifluoromethyl) borate, pentafluoroethyltrifluoro borate, bis(pentafluoroethyl)difluoro borate, tris(pentafluoroethyl) fluoro borate, tetrakis(pentafluoroethyl) borate and the like.

Anions represented by the following formula

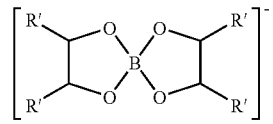

wherein R' represents hydrocarbon group having 1 to 10 carbon atoms which optionally has hydroxyl group, amino group, nitro group, cyano group, chloro group, fluoro group, formyl group or a group having ether bonding, or hydrogen atom or fluorine atom; each of R's may be same or different and R's may form a ring by binding with alkylene group each other.

Anions represented by the following formula

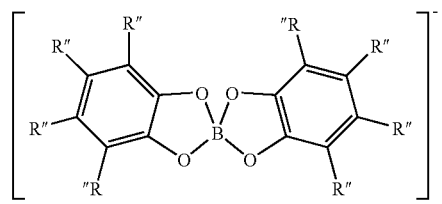

wherein R" represents the same meaning as R'; each of R"'s may be same or different and R"'s may form a ring by binding with hydrocarbon group each other.

Anions represented by the following formulas

wherein $R^1$ and $R^2$ represent monovalent organic group having 1 to 4 carbon atoms containing fluorine atom; $R^1$ and $R^2$ may be same or different and $R^3$ represents divalent organic group having 2 to 8 carbon atoms containing fluorine atom.

The anion is preferably an inorganic anion, more preferably $BF_4^-$, $AsF_6^-$, $SbF_6^-$, and further preferably $BF_4^-$ to enhance electrostatic capacity.

For an electrolytic solution containing an organic electrolyte, a solvent mainly composed of an organic polar solvent is used, and a water content contained in the electrolytic solution containing an organic electrolyte is usually 200 ppm or less, preferably 50 ppm or less, and more preferably 20 ppm or less. By suppressing the water content in the electrolytic solution containing an organic electrolyte, effects to the electrode due to water electrolysis, especially reduction of voltage endurance can be suppressed.

As a solvent for the electrolytic solution dissolving an electrolyte, the same solvent used for the imidazolium cation mentioned above can be exemplified.

As the electrolyte concentration of the electrolytic solution, the same concentration used for the imidazolium cation mentioned above is exemplified.

The method of applying thus obtained activated carbon to an electrode for an electric double-layer capacitor includes, for example, a method of using the activated carbon as itself after being carbonized, a method of using a crushed activated carbon and a method of using by molding a crushed activated carbon to various shapes such as pellet, granule, fiber, felt, fabric or sheet. The activated carbon used for molding is crushed into particles having an average particle diameter of usually 50 μm or less, preferably 30 μm or less, and more preferably 10 μm or less. By crushing the activated carbon in fine particles, bulk density of an electrode can be enhanced and internal resistance thereof can be reduced.

The crushing is preferably carried out by a crusher for fine grinding such as impact-friction crushers, centrifugal crushers, ball mills (tube mills, compound mills, conical ball mills, rod mills), vibrating mills, colloid mills, friction disk mills and jet mills.

If a ball mill, which is general for crushing, is employed, the ball and crushing vessel thereof is preferably made of non-metal materials such as alumina, zirconia and a gate to avoid contamination of metal powder.

The electrode of the present invention is characterized by including the above mentioned activated carbon therein, and usually further includes a binder, conducting agent and the like therein to improve moldability thereof.

The electrode is generally produced by methods for molding a mixture of an activated carbon, a binder, a conducting agent and the like on a current collector. These methods include, for example, a method of coating a slurry mixture of an binder, a conducting agent, a solvent and the like on a current collector by doctor blade method or dipping the collector in the slurry mixture, followed by drying; a method of preparing a sheet by mixing, molding and then drying a mixture of an activated carbon, a binder, a conducting agent, a solvent and the like, disposing the sheet on a current collector with interposing a conductive adhesive and then subjecting to pressing and heating treatments and drying; and a method of molding a mixture of an activated carbon, a binder, a conducting agent, a liquid lubricant and the like on a current collector, removing the liquid lubricant to obtain a sheet and then stretching the sheet in mono- or multi-axial directions.

When the electrode is formed in a sheet shape, the thickness thereof is about 50 to about 100 μm.

Ingredient materials for the current collector include, for example, metals such as nickel, aluminium, titanium, copper, gold, silver, platinum, aluminium alloy and stainless steel; carbon material or activated carbon fibers coated by plasma or ark spraying with nickel, aluminium, zinc, copper, tin or lead or an alloy thereof; and conductive films composed of resins containing a conducting agent dispersed therein such as rubbers and styrene-ethylene-butylene-styrene copolymer (SEBS). Aluminium is particularly preferable due to its lightness, excellent in conductivity and electrochemical stability.

Configurations of the current collector include, for example, foil, plate, mesh, net, lath, punching and emboss and a combination thereof (for example, meshed plate).

Corrugated surface may be formed on a surface of the current collector by etching.

The conducting agent includes, for example, electro-conductive carbons such as graphite, carbon black, acetylene black, Ketjenblack and activated carbons other than that of the invention; graphitic conductants such as natural graphites, thermally expandable graphites, flake graphites and expandable graphites; carbon fibers such as vapor-grown carbon fibers; fine powders or fibers of metals such as aluminium, nickel, copper, silver, gold and platinum; elecrto-conductive metal oxides such as ruthenium oxide or titanium oxide; and electro-conductive polymers such as polyaniline, polypyrrole, polythiophene, polyacetylene and polyacene.

Particularly preferable are carbon black, acetylene black and Ketjenblack due to their ability to effectively enhance conductivity with small quantity thereof.

Content of the conducting agent blended in the electrode is usually about 5 to about 50 parts by weight, preferably about 10 to about 30 parts by weight, based on 100 parts by weight of the activated carbon of the present invention.

The binder includes, for example, polymers of fluorine compounds; the fluorine compounds include, for example, fluorinated alkyl(1 to 18 carbon atoms)(meth)acrylate, perfluoroalkyl(meth)acrylates [such as perfluorododecyl(meth) acrylate, perfluoro-n-octyl(meth)acrylate and perfluoro-n-butyl(meth)acrylate], perfluoroalkyl-substituted alkyl(meth) acrylates [such as perfluorohexylethyl(meth)acrylate and perfluorooctylethyl(meth)acrylate], perfluorooxyalkyl (meth)acrylates [such as perfluorododecyloxyethyl(meth) acrylate and perfluorodecyloxyethyl(meth)acrylate], fluorinated alkyl(1 to 18 carbon atoms)crotonate, fluorinated alkyl (1 to 18 carbon atoms) malate and fumarate, fluorinated alkyl (1 to 18 carbon atoms) itaconate and fluorinated alkyl-substituted olefines (having 2 to 10 carbon atoms and 1 to 17 fluorine atoms) such as perfluorohexylethylene, fluorinated olefine having 2 to 10 carbon atoms and 1 to 20 fluorine atoms whose a fluorine atom binds to the double-bonded carbon atom, tetrafluoroethylene, trifluoroethylene, vinylidene fluoride and hexafluoropropylene.

The binder further includes, for example, polymers produced by addition polymerization of monomers having ethylenic double bond but not having fluorine atom; such monomers include, for example, (cyclo)alkyl(1 to 22 carbon atoms) (meth)acrylates [such as methyl(meth)acrylate, ethyl(meth) acrylate, n-butyl(meth)acrylate, iso-butyl(meth)acrylate, cyclohexyl(meth)acrylate, 2-ethylhexyl(meth)acrylate, iso-decyl(meth)acrylate, lauryl(meth)acrylate, octadecyl(meth)

acrylate); aromatic ring containing (meth)acrylates [such as benzyl(meth)acrylate and phenylethyl(meth)acrylate]; mono(meth)acrylates of alkyleneglycol or dialkyleneglycol (having 2 to 4 carbon atoms in its alkylene group) [such as 2-hydroxyethyl(meth)acrylate, 2-hydroxypropyl(meth)acrylate, diethyleneglycolmono(meth)acrylate]; and (poly)glycerin (1 to 4 of polymerization degree)mono(meth)acrylate; (meth)acrylates such as polyfunctional(meth)acrylates [such as (poly)ethyleneglycol (1 to 100 of polymerization degree)di(meth)acrylate, (poly)propyleneglycol (1 to 100 of polymerization degree)di(meth)acrylate, 2,2-bis(4-hydroxyethylphenyl)propanedi(meth)acrylate and, trimethylolpropanetri(meth)acrylate]; (metha)acrylamide-based monomers including (metha)acrylamide and (metha)acrylamidic derivatives [such as N-methylol(metha)acrylamide and diacetone acrylamide]; monomers containing cyano group such as (metha)acrylonitrile, 2-cyanoethyl(meth)acrylate and 2-cyanoethylacrylamide; styrene-based monomers such as styrene and styrene derivatives having 7 to 18 carbon atoms [such as a-methylstyrene, vinyltouene, p-hydroxystyrene and divinylbenzene]; diene-based monomers such as alkadiene having 4 to 12 carbon atoms [such as butadiene, isoprene and chloroprene]; alkenylester-based monomers which include vinyl carboxylate (having 2 to 12 carbon atoms) [such as vinyl acetate, vinyl propionate, vinyl butyrate and vinyl octanoate], and (meth)allyl carboxylate (having 2 to 12 carbon atoms) [such as (meth)allyl acetate(meth)allyl propionate and (meth)allyl octanoate]; monomers containing epoxy group such as glycidyl(meth)acrylate and (metha)allylglycidyl ether; monoolefines including monoolefine having 2 to 12 [such as ethylene, propylene, 1-butene, 1-octene and 1-dodecene]; monomers containing chlorine, bromine or iodine atoms, e.g. monomers containing halogen atoms excluding fluorine atom such as vinyl chloride and vinylidene chloride; (meth)acrylic acid such as acrylic acid and methacrylic acid; and monomers having conjugated double bonds such as butadiene and isoprene.

Further, the polymers produced by addition polymerization may be copolymers composed of a plurality of monomers such as ethylene-vinyl acetate copolymer, styrene-butadiene copolymer and ethylene-propylene copolymer. Furthermore, polymers of vinyl carboxylate may be partially or completely saponificated such as polyvinyl alcohol.

The binder may be copolymers composed of fluorine compounds and monomers having ethylenic double bond but not having fluorine atom.

The binder further include, for example, polysaccharides and derivatives thereof such as starch, methylcellulose, carboxymethylcellulose, hydroxymethylcellulose, hydroxyethylcellulose, hydroxypropylcellulose, carboxymethylhydroxyethylcellulose and nitrocellulose; phenol resins; melamine resins; polyurethane resins; urea resins; polyimide resins; polyamide-imide resins; petroleum pitches and coal-tar pitches.

Among them, the binder is preferably polymers of fluorine compound, particularly preferably polytetrafluoroethylene of tetrafluoroethylene polymer.

As the binder, a plurality of binders can be used. Amount of the binder blended in the electrode is usually about 0.5 to about 30 parts by weight, preferably about 2 to about 30 parts by weight, based on 100 parts by weight of activated carbon.

A solvent used for the binder includes, for example, alcohols such as IPA (isopropyl alcohol), ethanol and methanol as well as ethers and ketones.

When the binder is highly viscous, plasticizers may be applied to allow coatability on a current collector.

The conducting adhesives are usually a mixture of above described conducting agents and binders. Among them, a mixture of carbon black and polyvinyl alcohol is preferable because of solvent free, easy preparation and enhanced preservability thereof.

The electrode of the present invention is applied for an electrode of dry batteries, redox capacitors, hybrid capacitors and electric double-layer capacitors.

The redox capacitor is a device having an electrode containing active material to store electric power by oxidation-reduction reaction as described, for example, in the third chapter (from the 141 page) of "DAI-YOURYOU DENKI NIJYUSO CAPACITOR NO SAIZENSEN (The leading edge of large capacity electric double-layer capacitors, compiled under the editorship of TAMURA HIDEO, published by NTS Inc.) This capacitor is constituted with two electrodes interposing therebetween a similar separator used in the electric double-layer capacitor mentioned below and an electrolytic solution being filled therein. In the present invention, an electrolytic solution defines a mixture of an electrolyte and a solvent.

The active material used for the redox capacitor includes oxides of transition metals such as ruthenium, transition metal hydroxides and conductive polymers. The electrode includes the activated carbon of present the invention alone or 1 to 60% by weight of a mixture of the activated carbon of the present invention and the conducting agent exemplified above and 2 to 30% by weight of the binder exemplified above.

The electrolytic solution for the redox capacitor, when an oxide of transition metals such as ruthenium or transition metal hydroxide is used as the active material, includes aqueous sulfuric acid solution, for example, under conditions disclosed in Kokai No. 2002-359155. When using an organic acid as the electrolyte and an electrolytic solution dissolved in an organic solvent, for example, conditions disclosed in Kokai No. 2002-267860 are applied. When using a conductive polymer as the active material, an electrolyte capable of being dissolved in an organic solvent and dissociated may be applied, for example, including lithium salts such as $LiBF_4$, $LiPF_6$ and $LiClO_4$. $LiPF_6$ is particularly preferably applied due to large ionization degree and favorable solubility thereof. These electrolytes may be used alone, or a mixture of at least two kinds thereof, respectively. Concentration of the electrolyte in the electrolytic solution is preferably 0.5 to 1.5 mole/L in order to have favorable ionic conductivity. When the concentration of electrolyte is 0.5 mole/L or more, it is preferable to enhance the electrostatic capacity, and when 1.5 mole/L or less, it is preferable to enhance ionic conductivity due to reduction of viscosity of the electrolytic solution.

As the solvent contained in the electrolytic solution for the redox capacitor, an organic polar solvent exemplified for the electric double-layer capacitor mentioned hereinafter is preferably used. Among them, an aprotic organic solvent is preferably used, for example, a solvent of cyclic carbonates, chain carbonates or cyclic esters or a mixture of at least two kinds thereof are illustrated. The cyclic carbonates include, for example, ethylene carbonate, propylene carbonate and the like; the chain carbonates include, for example, dimethyl carbonate, diethyl carbonate, methylethyl carbonate and the like; and the cyclic carbonate esters include, for example, γ-butyrolactone, γ-valerolactone and the like. These may be used alone or a mixture of at least 2 kinds thereof, respectively. Required properties for the electrolytic solution are high dielectric constant to assist dissociation of electrolyte as well as low viscosity not to disturb mobility of ions and further high resistance against electrochemical oxidation and reduction. Therefore, the carbonates are particularly preferable for the solvent, for example, it is preferable to use a mixture of ethylene carbonate as a solvent having high dielectric constant and diethyl carbonate as a solvent having low viscosity.

The hybrid capacitor is a device in which, during charging, lithium ions are induced into layers of carbon such as graphite at the negative pole and anions of electrolyte are drawn on the electrode surface at the positive pole, resulting of formation of electric double layer to store electric power. This capacitor is constituted by using a similar electrode at the negative pole as applied for a negative pole of lithium-ion secondary battery, using the above mentioned electrode of the present invention at the positive pole, interposing a similar separator as used in the electric double-layer capacitor mentioned below between the positive and negative electrodes and filling an electrolytic solution therein. Specifically, as the electrode of negative pole, those described in the third section of the first chapter (from the 25 page) of "JISEDAI-KATA LITHIUM NIJI-DENTI (Lithium secondary batteries in the next generation, compiled under the editorship of TAMURA HIDEO, published by NTS Inc.) can be used.

The electrolyte for hybrid capacitor usually employs combinations of inorganic anions and lithium cation, and preferably a combination of lithium cation and at least one inorganic anion selected from the group consisting of $BF_4^-$, $PF_6^-$ and $ClO_4^-$.

The organic polar solvent contained in the electrolytic solution for the hybrid capacitor usually employs a solvent mainly composed of at least one kind of the group consisting of carbonates and lactones. The solvent includes, for example, cyclic carbonates such as propylene carbonate, ethylene carbonate and butylene carbonate, chain carbonates such as dimethyl carbonate, ethylmethyl carbonate and diethyl carbonate, and γ-butyrolactone; and preferably a mixture of ethylene carbonate and at least one kind of chain carbonates, γ-butyrolactone alone or a mixture of γ-butyrolactone and at least one kind of chain carbonates.

Additives such as those exemplified in the section about electric double-layer capacitor can be used.

The electrode of the present invention is preferably used for an electrode of the electric double-layer capacitor because of the enhanced electrostatic capacity thereof. The electric double-layer capacitor is explained in more detail below.

The electric double-layer capacitor of the present invention is a capacitor characterized by including the electrode above mentioned; specifically, being a capacitor constituted by disposing independently a separator between the two electrodes as positive and negative electrodes mentioned above and filling an electrolytic solution between the separator and the electrodes, or being a capacitor constituted by filling a solid electrolyte (a gel electrolyte) between the two electrodes as positive and negative electrodes mentioned above.

According to charging, the positive electrode is positively charged resulting formation of an electric double layer at the boundary of the positive electrode by negative electrolyte as well as the negative electrode is negatively charged resulting formation of an electric double layer at the boundary of the negative electrode by positive electrolyte, consequently electric energy is stored. The electric double layers are maintained after stopping charging, but dissipate along with releasing electric energy by discharging.

The electric double-layer capacitor may be constituted with a single cell including positive and negative poles, or a combination of plurality cells.

The solid electrolyte is a resin dispersed with an electrolyte mentioned hereinafter, and may be further dispersed with an organic polar solvent also mentioned hereinafter; specifically including a gel electrolyte described at the 79 page of "DAI-YOURYOU DENKI NIJYUSO CAPACITOR NO SAI-ZENSEN (The leading edge of large capacity electric double-layer capacitors, compiled under the editorship of TAMURA HIDEO, published by NTS Inc.) or solid electrolytes disclosed in Kokai No. 2004-172346 and cited documents thereof, Kokai No. 2004-303567 and cited documents thereof, Kokai No. 2003-68580 and cited documents thereof and Kokai No. 2003-257240.

The electric double-layer capacitor of the present invention is preferably an electric double-layer capacitor which has an independent separator between two electrodes as positive and negative electrodes mentioned above and fills an electrolytic solution between the separator and electrodes; this electric double-layer capacitor is explained in more detail hereinafter.

Configurations of the electric double-layer capacitor include coin-shaped, wound, laminated or accordion formations, and the like.

A method for producing a coin-shaped capacitor includes, as shown in FIG. 1, layering (or laminating) a current collector (12), an electrode (13), a separator (14), an electrode (13) and a current collector (12) in this order within a metallic case (11) made of stainless steel and the like, filling the case with an electrolytic solution and then sealing with a metallic lid (15) and gasket (16).

Figure 2:
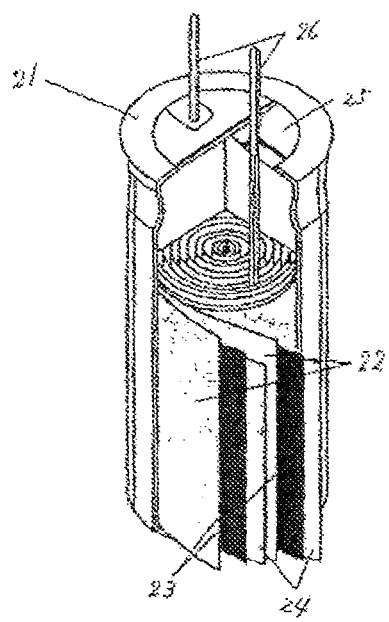
FIG. 2 is a schematic diagram of one embodiment of a wound electric double-layer capacitor.

A method for producing a wound capacitor includes, as shown in FIG. 2, coating on a current collector (22) a slurry mixture containing the above mentioned activated carbon and then drying to prepare a laminated sheet composed of the current collector (22) and an electrode (23), winding two of the sheets with interposing a separator (24) therebetween and then housing this wound sheets in a metallic case (21) made of aluminium, stainless steel and the like together with an electrode sealing pad (25).

In this method, since the current collector is previously equipped with a lead, electric energy is charged or discharged through a lead (26) provided to one layered sheet as a positive pole and another lead (26) provided to another layered sheet as a negative pole.

Figure 3:
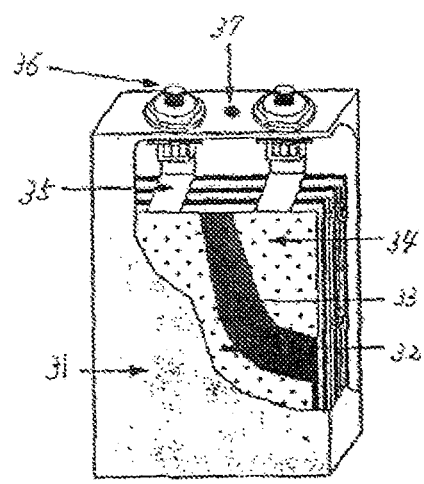
FIG. 3 is a schematic diagram of one embodiment of a laminated electric double-layer capacitor.
Figure 4:
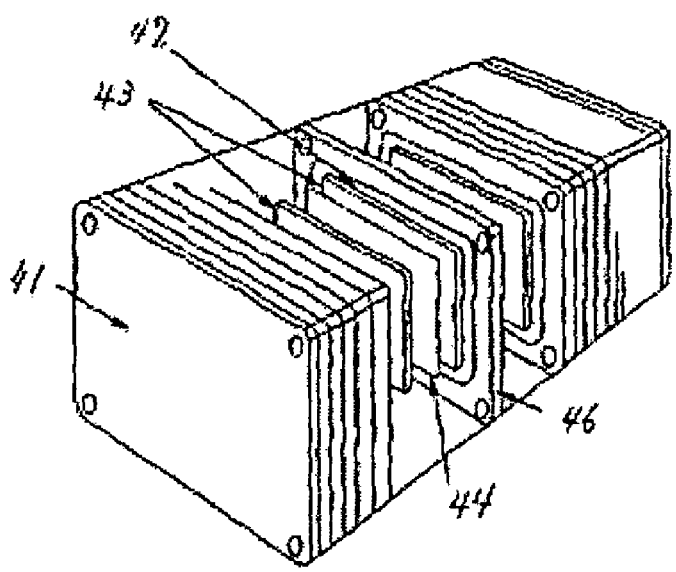
FIG. 4 is a schematic diagram of another embodiment of a laminated electric double-layer capacitor different from the capacitor drawn in FIG. 3.

A method for producing a layered capacitor includes, as shown in FIG. 3, alternately laminating (or piling) a layered sheet composed of a current collector (32) and an electrode (33) on a separator (34), housing this layers in a metallic case (31) made of aluminium, stainless steel and the like, filling the case with an electrolytic solution, alternately connecting the current collectors to a lead (35) and then sealing; or a method, as shown in FIG. 4, alternately connecting with pressure a layer sheet composed of a current collector (42) and an electrode (43) on a separator (44), sealing the outermost layer with rubber and the like, filling an electrolytic solution and then sealing. In this method, a bipolar structure appropriately including a gasket (46) is possible to optionally adjust an application voltage.

Figure 5:
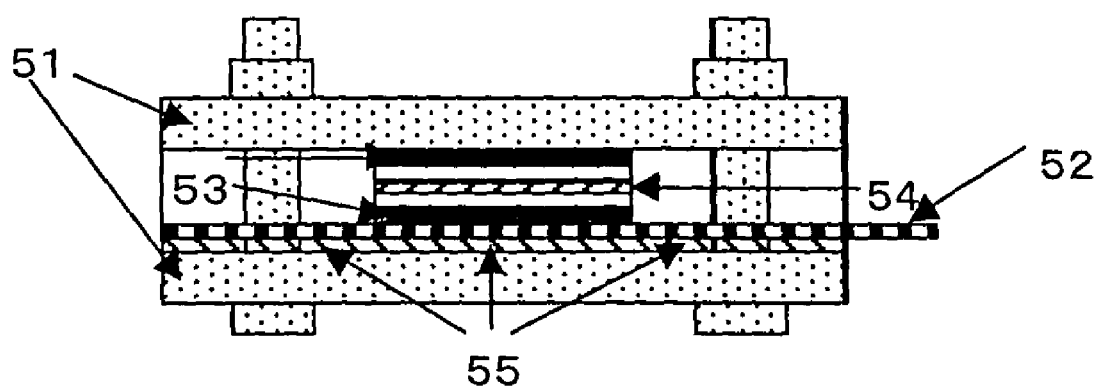
FIG. 5 is a schematic diagram of one embodiment of the laminated electric double-layer capacitor used in Examples and Comparative Examples of the invention.
Each of numerals referred in the drawings denotes the corresponding terms respectively as listed below.
11: Metallic case
12: Current collector
13: Electrode
14: Separator
15: Metallic lid
16: Gasket
21: Metallic case
22: Current collector
23: Electrode
24: Separator
25: Electrode sealing pad
26: Lead
31: Metallic case
32: Current collector
33: Electrode
34: Separator
35: Lead
36: Terminal
37: Safety valve
41: Pressure plate and terminal
42: Current collector
43: Electrode
44: Separator
46: Gasket
51: Pressure plate
52: Current collector
53: Electrode
54: Separator
55: Insulating material

Examples of the present invention are carried out with an electric double-layer capacitor which is constituted, as shown in FIG. 5, by layering a sheet-shaped electrode (53), a separator (54), an electrode (53), an current collector (52) and insulating material (55) in this order between pressure plates (51), filling an electrolytic solution between the separator (54) and the electrode (53), sealing the outermost layer with fluorine resin and then fastening by bolts. The bolts are insulated from the current collector (52).

A method for producing an accordion capacitor includes layering in accordion-folding manner an electrode and two current collector sheets with interposing a separator therebetween, and then preparing by the same way as applied to the layered capacitor.

The separator used for the electric double-layer capacitor functions to separate positive and negative electrodes and to retain an electrolytic solution; for this reason, it applies a membrane having large ionic permeability, predetermined mechanical strength and electric insulating ability.

The separator includes, for example, papers made of a viscose rayon, natural cellulose and the like, electrolytic papers, kraft papers, manila papers, mixed papers made of fibers such as cellulose and polyester, polyethylene non-woven fabrics, polypropylene non-woven fabrics, polyester non-woven fabrics, glass fibers, porous polyethylenes, porous polypropylenes, porous polyesters, aramid fibers, polybutyleneterephthalate non-woven fabrics, wholly aromatic p-polyamides, vinylidene fluoride, tetrafluoroethylene, copolymers of vinylidene fluoride and hexafluoro propylene, and fabrics and porous membranes of resins containing fluorine atom such as fluororubber.

The separator may be a molded article composed of particles of ceramics such as silica and binders mentioned above. The molded article is usually integrally molded with both of positive and negative electrodes. A separator employing polyethylene or polypropylene may contain surfactants or silica particles to enhance hydrophilicity thereof. The separator may further contain organic solvents such as acetone, plasticizer such as dibutylphthalate (DBP), and others.

As the separator, a proton conductive polymer can be used.

Among them, preferable separators include electrolytic papers, papers made of a viscose rayon or natural cellulose, kraft papers, manila papers, mixed papers made of cellulose or polyester fibers, polyethylene non-woven fabrics, polypropylene non-woven fabrics, polyester non-woven fabrics, sheets of Manila hemp and sheets of glass fibers.

The separator usually has pores of about 0.01 to about 10 μm. The separator usually has thickness of about 1 to about 300 μm, preferably about 5 to about 30 μm.

The separator may be a layered separator laminating separators having different pore ratios.

EXAMPLE

The invention is explained in detail based on Examples, but it is needless to say that the scope of the present invention is not limited to these Examples.

Example 1

33.0 g of resorcinol, 48.7 g of 37% by weight of formalin, 0.16 g of sodium carbonate and 22 g of distilled water were mixed in a reaction vessel, and the mixture was kept at 50° C. for 24 hours to obtain an organic aerogel wetted with water. In this case, the use amount of phenolic compound per 1 mole of the basic catalyst was 200 mole and the use amount of phenolic compound per 1 part by weight of water (as total water contained in the formalin and the distilled water) was 0.63 parts by weight.

The gel obtained was washed with t-butylalcohol to replace the contained water with t-butylalcohol. The gel replaced by t-butylalcohol was subjected to lyophilization at −30° C. for 24 hours under vacuum, followed by calcining at 800° C. under argon atmosphere to obtain an activated carbon. The obtained activated carbon had 0.47 cc/g of pore volume.

The obtained activated carbon was crushed to powder, and a mixture of 80 parts by weight of the powder obtained, 10 parts by weight of carbon black and 10 parts by weight of polytetrafluoroethylene was blended, followed by molding to a sheet. Thereafter, a paper was inserted between two sheets obtained, and then an electrolytic solution composed of propylene carbonate including 3 mole/L of $EMI^+BF_4^-$ salt was filled in to produce a bipolar electric double-layer capacitor.

By subjecting the capacitor to a charging-discharging measurement at a constant current (100 mA/g), the electrostatic capacity per unit volume of the activated carbon was 21.3 F/cc and the electrostatic capacity per unit weight thereof was 20.2 F/g. The results are shown in Table 1.

Examples 2 to 10

Examples 2 to 10 were carried out in the same manner as in Example 1 except that Examples were carried out under the conditions illustrated in Table 1. The results are shown in Table 1.

Comparative Example 1

Comparative Example 1 was carried out in the same manner as in Example 1 except that $TEA \cdot BF_4$ was used as an electrolyte. The results are shown in Table 1.

Example 11

Example 11 was carried out in the same manner as in Example 1 except that a mixture of 27.5 g of resorcinol, 40.6 g of 37% by weight formalin, 0.13 g of sodium carbonate and 55.1 g of distilled water was used and was calcined at 1000° C. The results are shown in Table 1.

Comparative Example 2

Comparative Example 2 was carried out in the same manner as in Example 11 except that $TEA \cdot BF_4$ was used as an electrolyte. The results are shown in Table 1.

TABLE 1

| | Electrolytic solution | | | | | Calcining temp. (° C.) | Electro Static capacity | |
|---|---|---|---|---|---|---|---|---|
| | Electrolyte | | Conc. | | Mixing ratio | | | |
| | Cation | Anion | (M) | Solvent | (v/v) | | F/cc | F/g |
| EX. 1 | EMI+ | BF4− | 3 | PC | — | 800 | 21.3 | 20.2 |
| EX. 2 | BMI+ | BF4− | 1 | PC | — | 800 | 17.3 | 17.2 |
| EX. 3 | EDMI+ | BF4− | 1 | PC | — | 800 | 17.9 | 17.9 |
| EX. 4 | EMI+ | BF4− | 1 | EC/DMC | 1/2 | 800 | 20.1 | 20.1 |
| EX. 5 | EMI+ | BF4− | 1 | GBL/EC | 2/1 | 800 | 20.3 | 20.3 |
| EX. 6 | EMI+ | BF4− | 1 | PC/EC/DMC | 1/1/1 | 800 | 19.9 | 19.8 |
| EX. 7 | EMI+ | BF4− | 2 | PC/EC/DMC | 1/1/1 | 800 | 21.1 | 21.0 |

TABLE 1-continued

| | Electrolytic solution | | | | | Electro Static capacity | |
|---|---|---|---|---|---|---|---|
| | Electrolyte | | Conc. | | Mixing ratio | Calcining temp. | |
| | Cation | Anion | (M) | Solvent | (v/v) | (° C.) | F/cc | F/g |
| EX. 8 | EMI+<br>EMI+ | BF4−<br>CF3COO− | 0.9<br>0.1 | PC | — | 800 | 19.2 | 19.2 |
| EX. 9 | EMI+<br>TMPA+ | BF4−<br>TFSI− | 0.9<br>0.1 | PC | — | 800 | 19.6 | 19.5 |
| EX. 10 | EM+<br>EMI+<br>TMPA+ | BF4−<br>CF3COO−<br>TFSI− | 0.8<br>0.1<br>0.1 | PC | — | 800 | 20.0 | 19.9 |
| C. EX. 1 | TEA+ | BF4− | 1 | PC | — | 800 | 9.7 | 9.7 |
| EX. 11 | EMI+ | CF3COO− | 1 | PC | — | 1000 | 11.5 | 16.5 |
| C. EX. 2 | TEA+ | BF4− | 1 | PC | — | 1000 | 6.8 | 9.8 |

[Electrolyte]
EMI+: 1-ethyl-3-methylimiaazolium (Formula (2))
BMI+: 1-butyl-3-methylimidazolium (Formula (3))

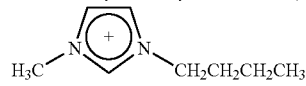

(3)
EDMI+: 1-ethyl-2,3-dimethylimiaazolium (Formula (4))

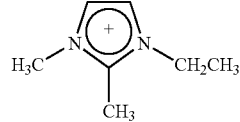

(4)
TMPA+: N,N,N-trimethyl-N-propylammonium (Formula (5))

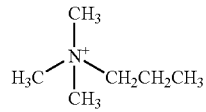

(5)
TFSI−: Bis(trifluoromethanesulfonyl)imide (Formula (6))

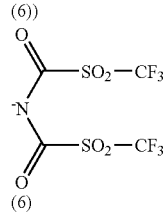

(6)
TEA+: tetraethylammonium
[Solvent]
PC: Propylene carbonate
EC: Ethylene carbonate
DMC: Dimethyl carbonate
GBL: γ-Butyrolactone Examples 12 to 19

Examples 12 to 19 were carried out in the manner as in Example 1 except that use amounts of phenolic compound per 1 mol of sodium carbonate applied the values shown in Table 2, use amounts of phenolic compound per 1 part by weight of water (as total water contained in the formalin and the distilled water) applied the values shown in Table 2, calcining temperatures applied the values shown in Table 2, the electrolytic solution was prepared by including tetraethylammonium BF$_4$ salt as an electrolyte to adjust 1 mole/L concentration and the charging-discharging measurement was carried out at 30 mA/g of constant current. The results are shown in Table 2.

Comparative Examples 3

Comparative Examples 3 was carried out in the manner as in Example 1 except that use amounts of phenolic compound per 1 part by weight of water (as total water contained in the formalin and the distilled water) applied the values shown in Table 2, calcining temperatures applied the values shown in Table 2, the electrolytic solution was prepared by including tetraethylammonium BF$_4$ salt as an electrolyte to adjust 1 mole/L concentration and the charging-discharging measurement was carried out at 30 mA/g of constant current. The results are shown in Table 2.

TABLE 2

| | R/C[*1] | R/W[*2] (Parts by weight) | Calcinig Temp. (°C.) | Pore Volume (cc/g) | Electrostatic Capacity (F/cc) | Electrostatic Capacity (F/g) |
|---|---|---|---|---|---|---|
| EX. 1 | 200 | 0.63 | 800 | 0.47 | 21.3 | 20.2 |
| 12 | 200 | 0.63 | 750 | 0.58 | 11.7 | 12.4 |
| 13 | 200 | 0.63 | 1000 | 0.43 | 10.1 | 9.7 |
| 14 | 200 | 0.66 | 800 | 0.53 | 11.8 | 11.9 |
| 15 | 200 | 0.70 | 800 | 0.41 | 11.1 | 9.8 |
| 16 | 1000 | 0.63 | 1000 | 0.74 | 8.1 | 9.9 |
| 17 | 1000 | 0.66 | 1000 | 0.71 | 8.2 | 9.7 |
| 18 | 1000 | 0.70 | 1000 | 0.62 | 8.2 | 9.0 |
| 19 | 2000 | 0.42 | 1000 | 0.66 | 7.9 | 9.0 |
| Com. Ex. 3 | 200 | 0.059 | 1000 | 3.5 | 3.2 | 12.8 |

[*1]Use amount of phenolic compound per 1 mol of sodium carbonate
[*2]Use amount of phenolic compound per 1 part by weight of water (as total water contained in formalin and distilled water)

INDUSTRIAL APPLICABILITY

The activated carbon of the present invention can be used to, for example, an electrode for dry batteries, a sensor for piezoelectric elements, a carrier having catalysts, a material for chromatographs, adsorbents, an electrode for electric double-layer capacitors, and preferably used to the electrode for electric double-layer capacitors due to the enhanced electrostatic capacity per unit volume thereof.

The electric double-layer capacitor of the present invention can be utilized for adsorption or storage of energy source due to the enhanced electrostatic capacity per unit volume thereof; particularly, according to the excellent characteristics thereof, can be preferably used for adsorbing or storing energy source in the fields such as portable electric terminals and transportation vehicles characterized by battery-powered driving force.

What is claimed is:

1. An electric double-layer capacitor comprising an electrode containing an activated carbon, an electrolytic solution containing an electrolyte and a separator, wherein the electrolyte is an imidazolium salt represented by the following formula (1)

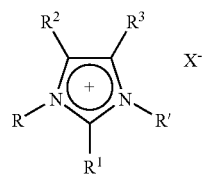

(1)

(wherein R and R' each independently represent alkyl group having 1 to 6 carbon atoms, $R^1$ to $R^3$ each independently represent hydrogen atom or alkyl group having 1 to 6 carbon atoms and $X^-$ represents a counter ion), and the activated carbon is produced by carbonizing an organic aerogel obtained by polymerizing a phenolic compound having at least one hydroxyl group in its molecule with an aldehyde compound in an aqueous solvent in the presence of a basic catalyst.

2. The electric double-layer capacitor according to claim 1, wherein the counter ion for the electrolyte is at least one ion selected from the group consisting of trifluoroacetate ($CF_3CO_2^-$) and tetrafluoroborate ($BF_4^-$).

3. The electric double-layer capacitor according to claim 1, wherein the phenolic compound is resorcinol.

4. The electric double-layer capacitor according to claim 1, wherein the activated carbon is produced by applying the phenolic compound in an amount of 0.25 to 1000 moles per 1 mole of the basic catalyst and 0.5 to 5 parts by weight per 1 part by weight of the aqueous solvent.

5. The electric double-layer capacitor according to claim 1, wherein the activated carbon is carbonized at 650 to 850° C.

6. The electric double-layer capacitor according to claim 1, wherein the activated carbon has pore volume of 1.5 cc/g or less.

7. An activated carbon obtained by polymerizing a phenolic compound having at least one hydroxyl group in its molecule with an aldehyde compound in an aqueous solvent in the presence of a basic catalyst and having pore volume of 0.3 to 0.6 cc/g.

8. The activated carbon according to claim 7, wherein the phenolic compound is resorcinol.

9. An electrode containing the activated carbon according to claim 7.

10. An electric double-layer capacitor comprising the electrode according to claim 9, a separator and an electrolytic solution.

11. A method for producing an activated carbon comprising polymerizing a phenolic compound having at least one hydroxyl group in its molecule with an aldehyde compound in an aqueous solvent in the presence of a basic catalyst to obtain an organic aerogel, and carbonizing the organic aerogel, wherein the polymerization is conducted by applying the phenolic compound in an amount of 0.25 to 1000 moles per 1 mole of the basic catalyst and 0.5 to 5 parts by weight per 1 part by weight of the aqueous solvent.

12. The method according to claim 11, wherein the carbonization is conducted at 650 to 850° C.

* * * * *